US008347811B2

(12) United States Patent
Bucci

(10) Patent No.: US 8,347,811 B2
(45) Date of Patent: Jan. 8, 2013

(54) SYSTEM AND METHOD FOR SUPPORTING AN OBJECT DURING APPLICATION OF SURFACE COATING

(76) Inventor: Michael Bucci, Glen Allen, VA (US)

( * ) Notice: Subject to any disclaimer, the term of this patent is extended or adjusted under 35 U.S.C. 154(b) by 884 days.

(21) Appl. No.: 12/442,626

(22) PCT Filed: Oct. 1, 2007

(86) PCT No.: PCT/US2007/080061

§ 371 (c)(1), (2), (4) Date: Mar. 24, 2009

(87) PCT Pub. No.: WO2008/045710

PCT Pub. Date: Apr. 17, 2008

(65) Prior Publication Data

US 2009/0283035 A1 Nov. 19, 2009

Related U.S. Application Data

(60) Provisional application No. 60/869,793, filed on Dec. 13, 2006, provisional application No. 60/828,243, filed on Oct. 5, 2006.

(51) Int. Cl.

| | |
|---|---|
| ***B05C 13/00*** | (2006.01) |
| ***B05C 13/02*** | (2006.01) |
| ***B05C 21/00*** | (2006.01) |
| ***B23Q 1/00*** | (2006.01) |
| ***B23Q 3/00*** | (2006.01) |
| ***B66F 19/00*** | (2006.01) |

(52) U.S. Cl. ........ 118/500; 118/501; 118/502; 118/728; 118/730; 269/53; 269/54.4; 269/289 R; 269/297; 269/303; 269/310; 269/311; 269/312; 294/213

(58) Field of Classification Search ........................ None
See application file for complete search history.

(56) References Cited

U.S. PATENT DOCUMENTS

| | | | | | |
|---|---|---|---|---|---|
| 2,483,734 | A | * | 10/1949 | Neal | 116/63 R |
| 3,416,270 | A | * | 12/1968 | McHugh | 248/687 |
| 3,940,100 | A | | 2/1976 | Haug | |
| 3,944,203 | A | * | 3/1976 | Brekelbaum | 269/296 |
| 3,974,611 | A | | 8/1976 | Satterthwaite | |
| 4,039,799 | A | * | 8/1977 | Stumpf | 219/121.67 |
| 4,184,840 | A | * | 1/1980 | Gamberg et al. | 432/253 |
| 4,269,008 | A | * | 5/1981 | Assouline | 52/101 |

(Continued)

OTHER PUBLICATIONS

Wood (Better Homes and Gardens), Tips From Your Shop (and Ours), p. 16, Dec. 1985, 2 pages.

(Continued)

*Primary Examiner* — Dah-Wei Yuan
*Assistant Examiner* — Binu Thomas
(74) *Attorney, Agent, or Firm* — Brian J. Teague

(57) ABSTRACT

A system is provided that is capable of supporting an object during application of surface coating that would enable access to multiple surfaces of the object while minimizing the impact on any surface that has not dried. The system provides stable support for the object during the application process and allows the coatings of all surfaces to dry with minimal effect on the coated surface. The system comprises a plurality of support units. Each support unit comprises a base portion and a contact portion. Each base portion is adapted to rest stably upon a work platform and contact portion is adapted to contact an underside of the object during application of surface coating. The plurality of support units together supports the object above the work platform.

38 Claims, 31 Drawing Sheets

U.S. PATENT DOCUMENTS

| | | | | | |
|---|---|---|---|---|---|
| 4,354,288 | A | * | 10/1982 | Dennis | 5/400 |
| D268,315 | S | | 3/1983 | Kirk | |
| 4,548,418 | A | * | 10/1985 | Wendorff | 280/1 |
| 4,783,936 | A | * | 11/1988 | Hujsak | 52/108 |
| 4,903,796 | A | * | 2/1990 | Magyar et al. | 269/902 |
| 5,072,901 | A | * | 12/1991 | Scott | 248/49 |
| 5,085,397 | A | * | 2/1992 | Henkel | 248/688 |
| 5,115,343 | A | * | 5/1992 | Bennett | 116/63 C |
| 5,152,108 | A | * | 10/1992 | Madl, Jr. | 52/126.1 |
| 5,259,695 | A | * | 11/1993 | Mostkoff | 405/29 |
| 5,400,998 | A | | 3/1995 | Ma | |
| 5,601,645 | A | | 2/1997 | Nonomura et al. | |
| 5,615,429 | A | * | 4/1997 | Williams | 5/509.1 |
| 5,788,933 | A | * | 8/1998 | Peddicord | 422/275 |
| 5,895,304 | A | * | 4/1999 | Dixon | 446/70 |
| 5,945,161 | A | | 8/1999 | Hashimoto et al. | |
| 6,206,974 | B1 | * | 3/2001 | Iida et al. | 118/719 |
| 6,378,265 | B1 | * | 4/2002 | Konstandt | 52/655.2 |
| 6,953,338 | B2 | * | 10/2005 | Kreiser et al. | 432/259 |
| 7,490,808 | B2 | * | 2/2009 | Lemirande | 248/637 |
| 2005/0132957 | A1 | * | 6/2005 | El-Raghy et al. | 118/500 |

OTHER PUBLICATIONS

Lee Valley Christmas Gift Catalog 2007; p. 24, Item A, Painter's Pyramid.

International Preliminary Report on Patentability; Application No. PCT/US2007/080061; date of mailing Apr. 16, 2009.

* cited by examiner

FIG. 4a
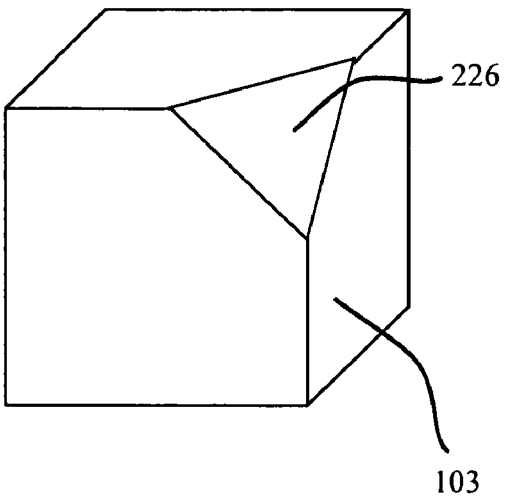
FIG. 4b
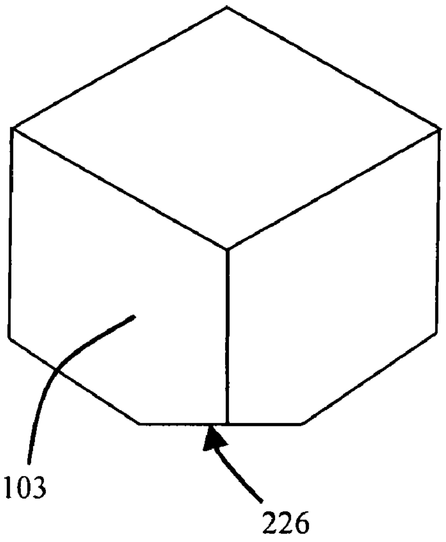
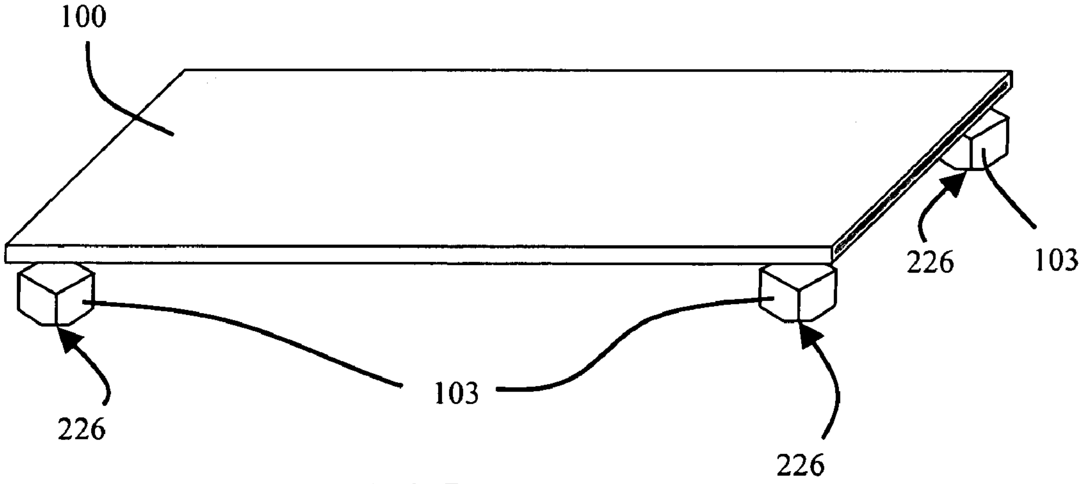
FIG. 4c

FIG. 7a
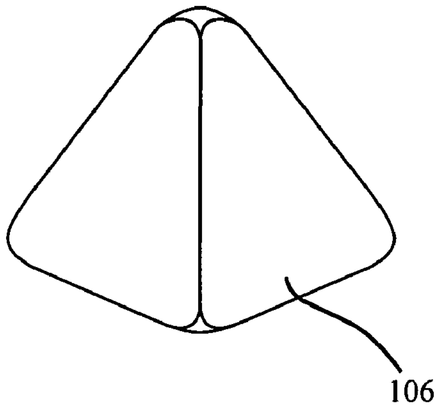
FIG. 7b
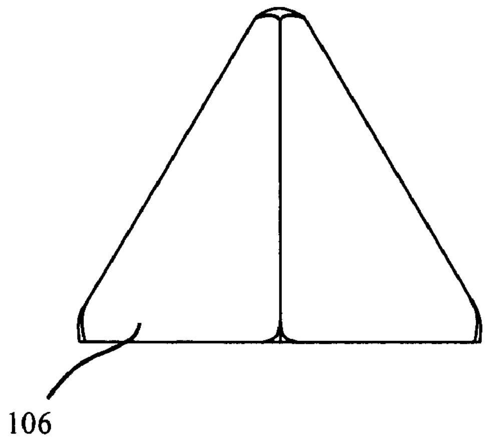
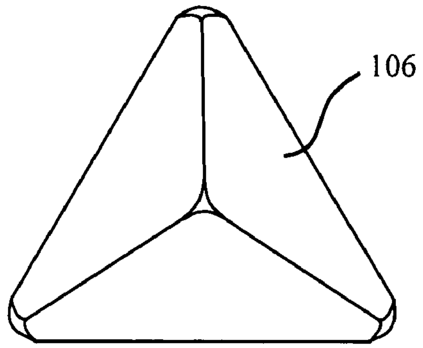
FIG. 7c
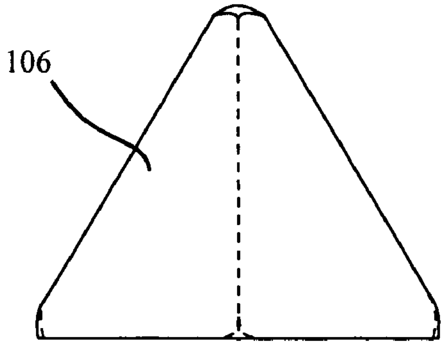
FIG. 7d

FIG. 8a
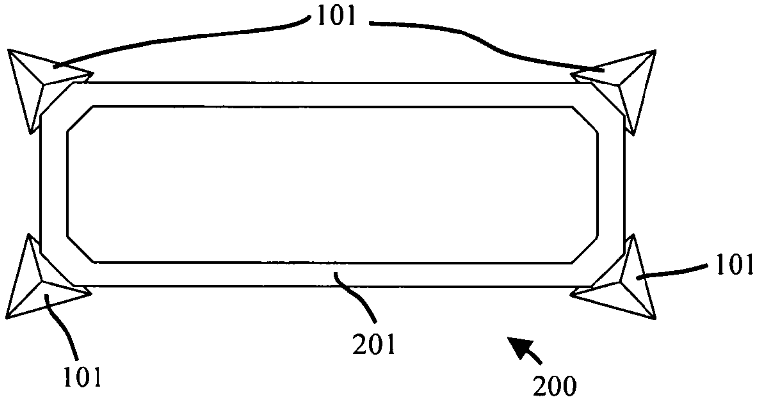
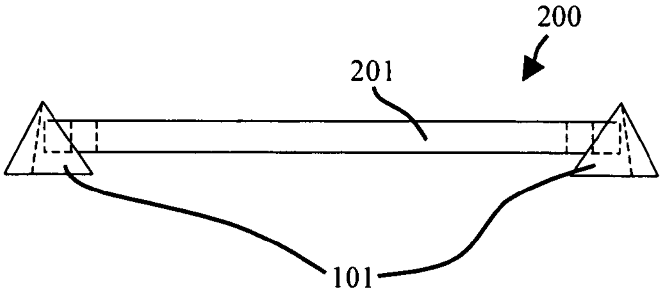
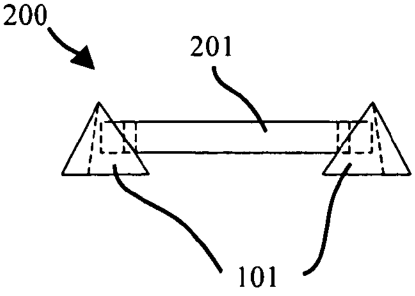
FIG. 8b
FIG. 8c

FIG. 9a
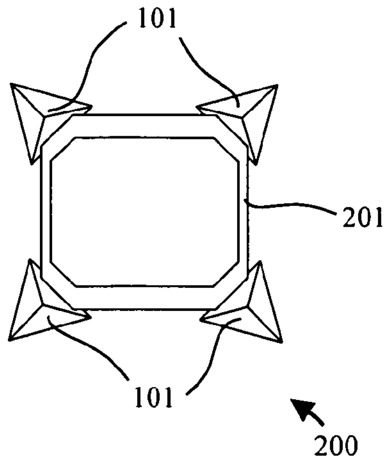
FIG. 9b
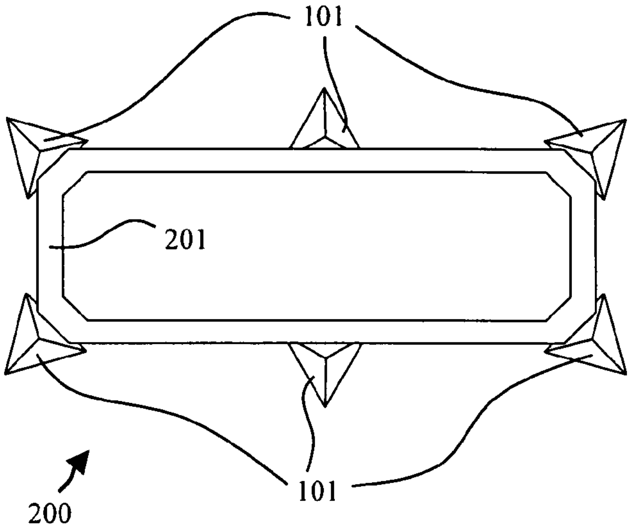
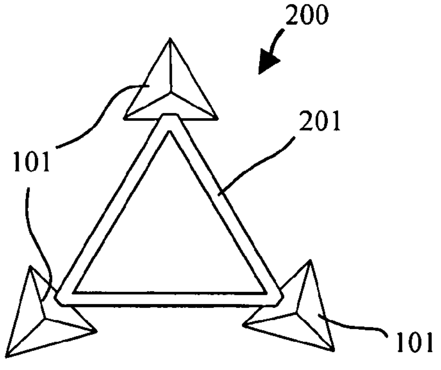
FIG. 9c
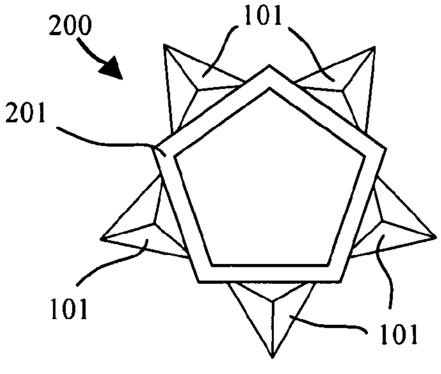
FIG. 9d

FIG. 10a
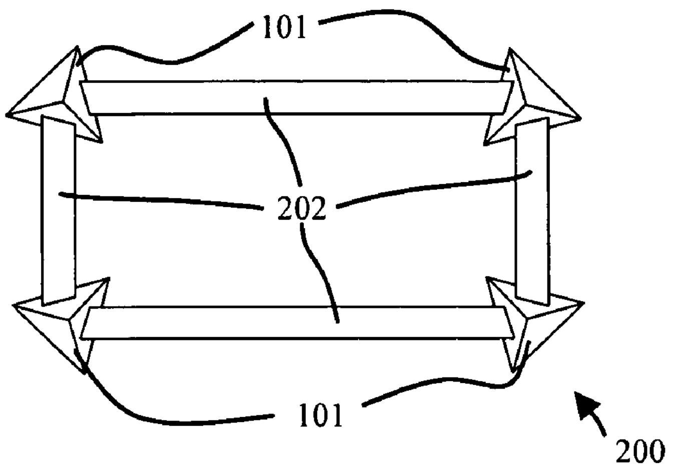
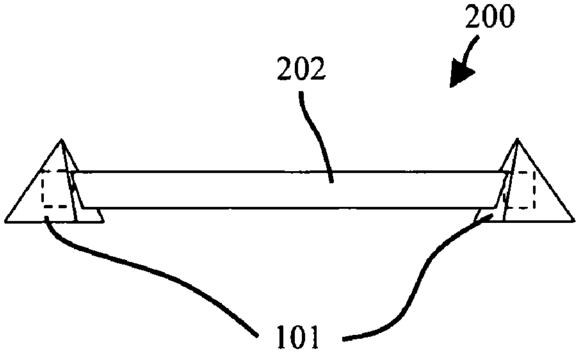
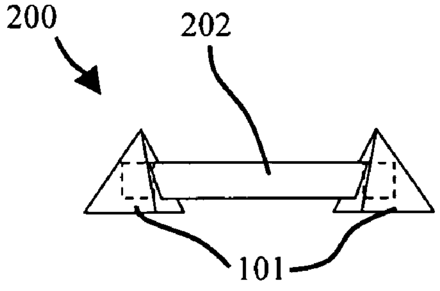
FIG. 10b
FIG. 10c

FIG. 14a
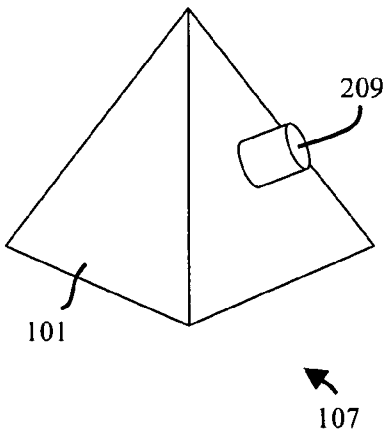
FIG. 14b
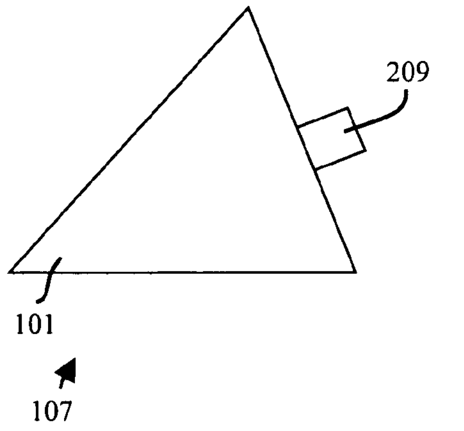
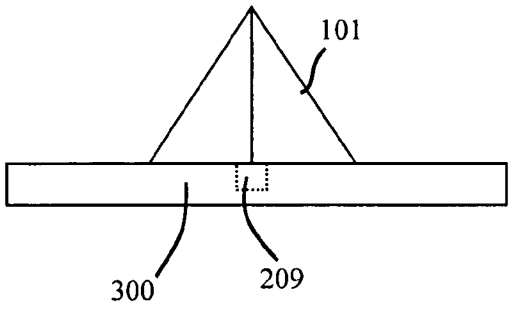
FIG. 14c
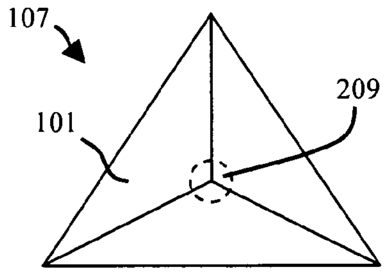
FIG. 14d

FIG. 15a
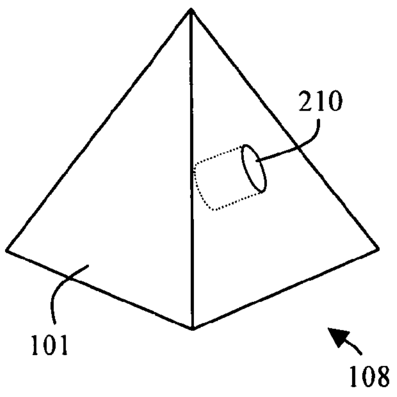
FIG. 15b
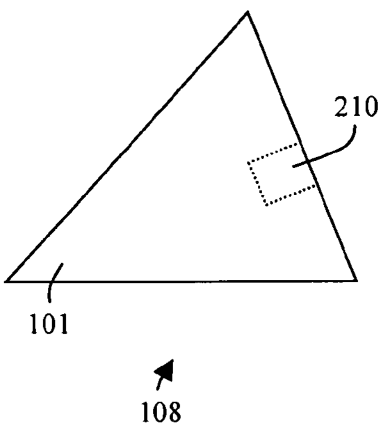
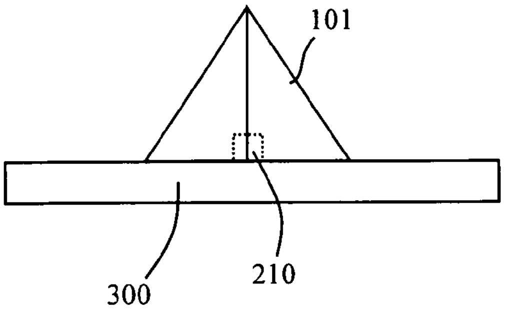
FIG. 15c
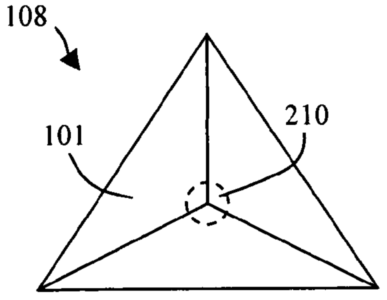
FIG. 15d

FIG. 19a
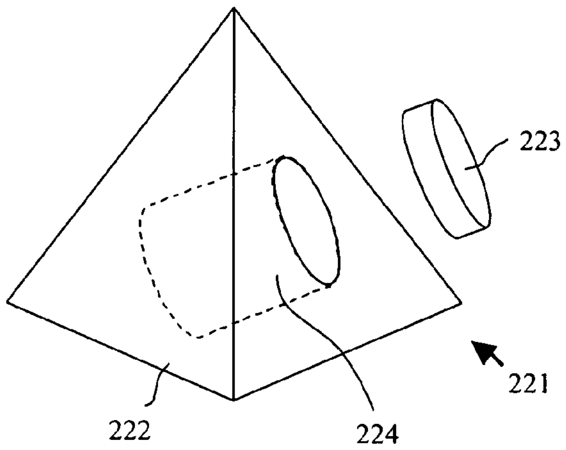
FIG. 19b
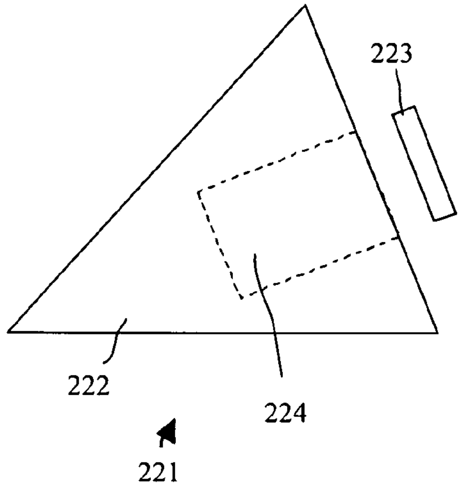
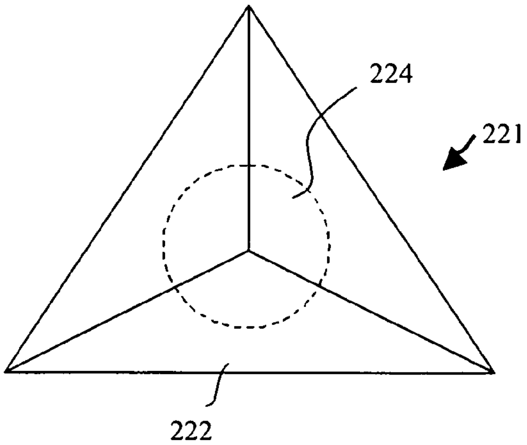
FIG. 19c
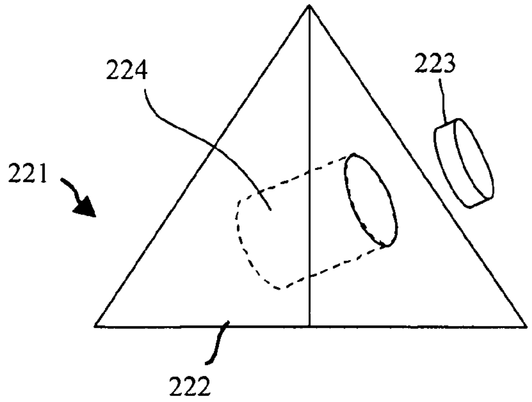
FIG. 19d

FIG. 22a
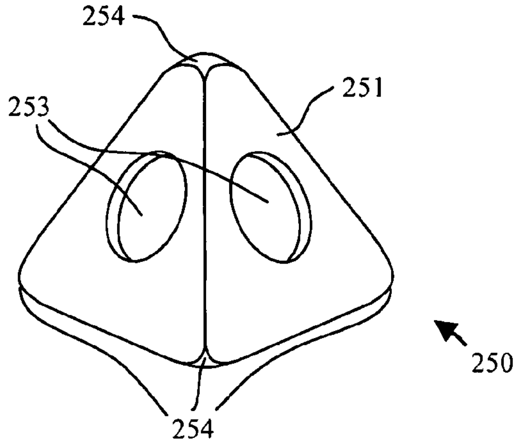
FIG. 22b
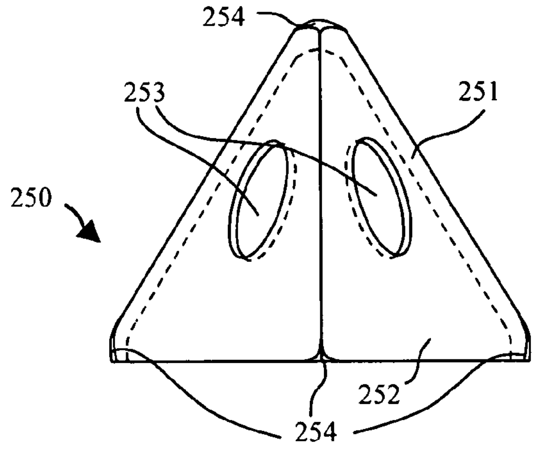
Note: Holes partially or fully hidden have been excluded for clarity
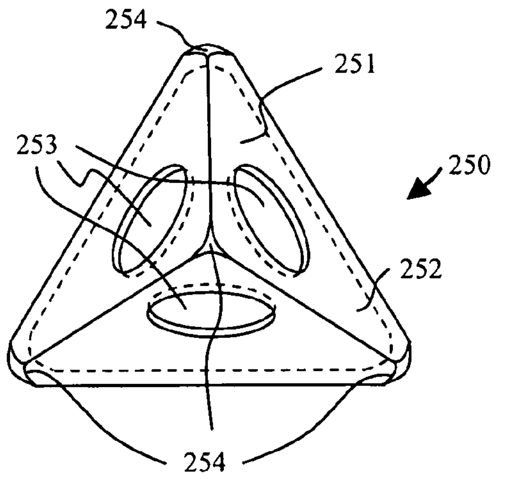
FIG. 22c
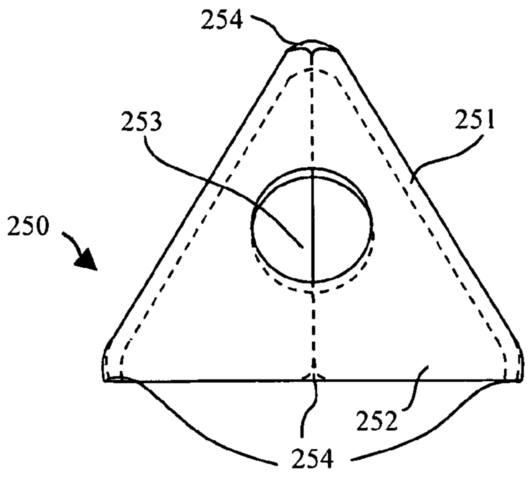
Note: Holes partially or fully hidden have been excluded for clarity
FIG. 22d Note: All holes have been excluded for clarity FIG. 24a
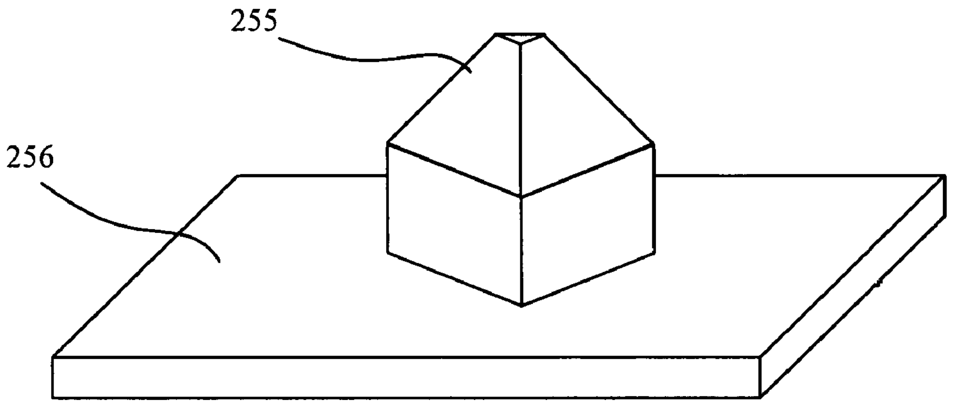
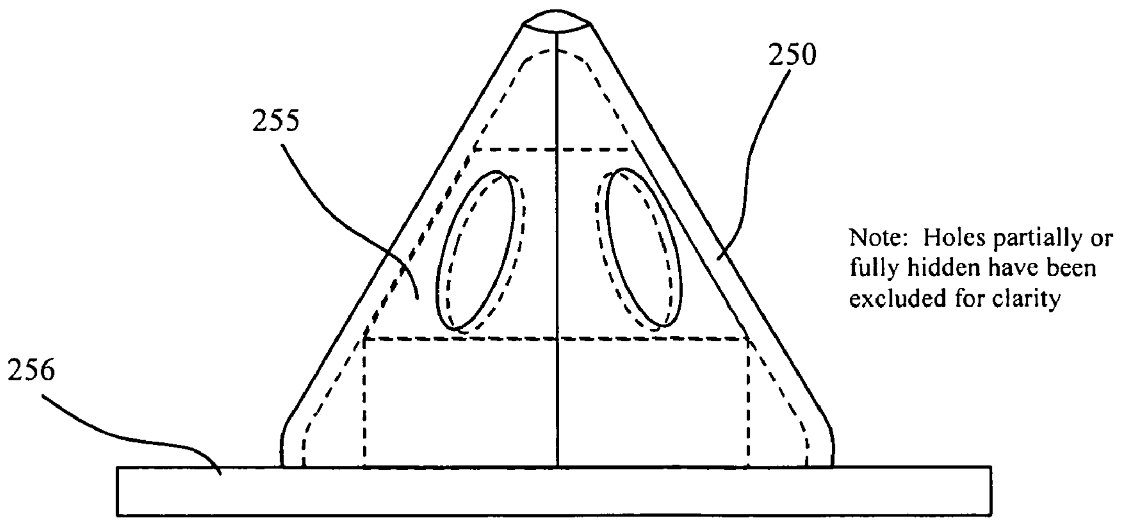
FIG. 24b FIG. 26
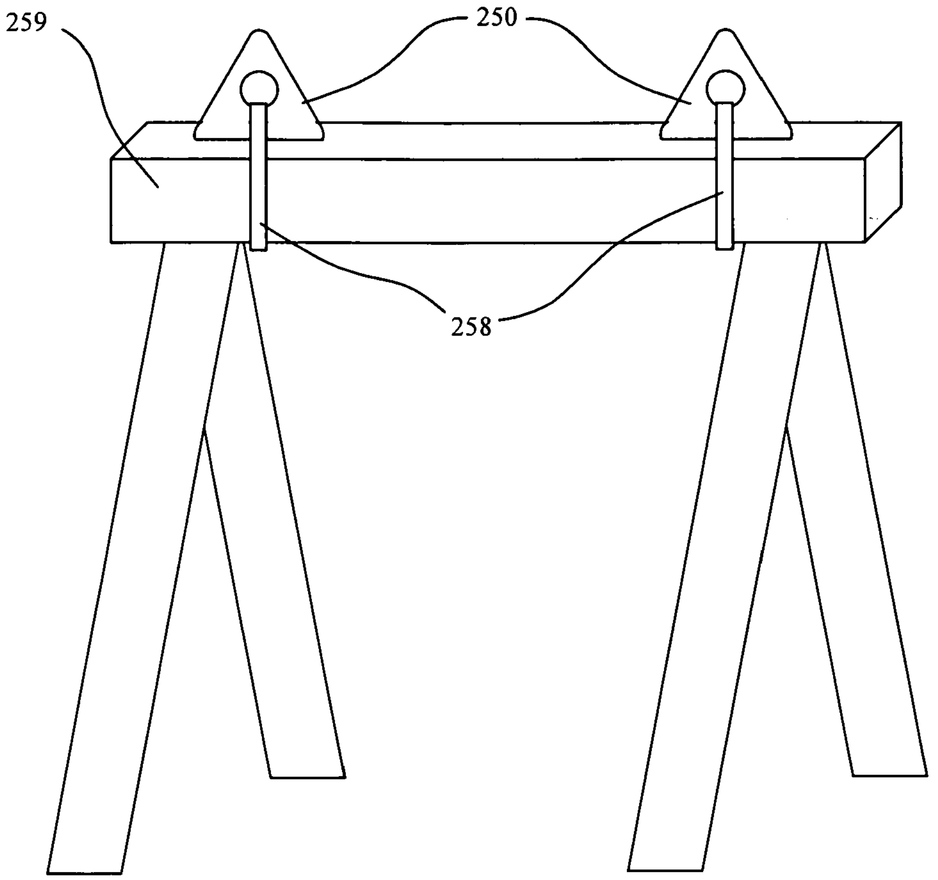
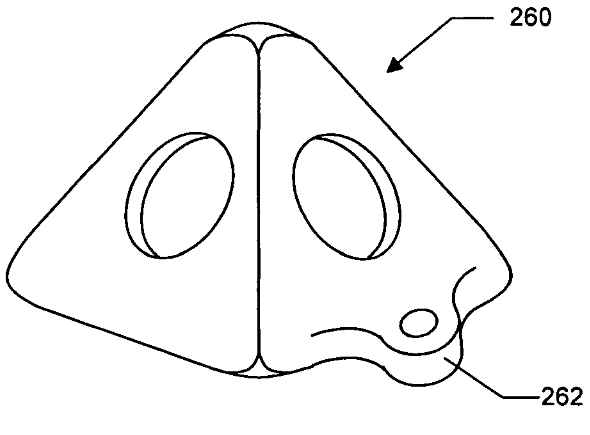
FIG. 27

301
302

301
302
300
303

301
300
303
302

300
302
301
303

SYSTEM AND METHOD FOR SUPPORTING AN OBJECT DURING APPLICATION OF SURFACE COATING

CROSS-REFERENCE TO RELATED APPLICATIONS

This application claims priority to International Application No. PCT/U507/80061, filed Oct. 1, 2007, which in turn claims priority to provisional U.S. Application No. 60/828,243, filed Oct. 5, 2006, and provisional U.S. Application No. 60/869,793, filed Dec. 13, 2006, the contents of which are incorporated herein by reference in their entirety.

FIELD OF THE INVENTION

The present invention relates to systems and methods for the application of surface coating to an object, and, more particularly, pertains to a system and method for supporting the object during application of the surface coating.

BACKGROUND OF THE INVENTION

The application of surface coatings, including but not limited to paints, stains, and surface sealants, to enhance the appearance or improve the functionality of objects is common in residential, commercial and industrial applications. There is a plurality of types of surface coatings, as well as, desired outcomes for the application of those surface coatings.

One common issue in the application of surface coatings occurs when it is desirable to apply the coating to multiple sides of an object. The issue created in the application process centers on the need for the surface coating to dry prior to application of that coating on another side of that object. Failure to allow adequate time for drying could result in the inclusion of unwanted debris into the coating or may have a material impact on the quality or appearance of the coating.

This issue commonly creates a situation in which the application process must be stopped to allow the coating to dry. It is common for this drying time to be extensive and necessitate cleanup of any tools used to apply the coating to ensure their functionality for future use. Additionally, this drying time may necessitate other cleanup and storage of the coatings or of the objects themselves.

For example, when painting a shelf it is commonly desired to paint both the top and the bottom of the shelf. Currently, that would require the application of paint to the top or the bottom of the shelf, then waiting for the paint to dry, prior to applying the paint to the other side of the shelf.

An opportunity exists to introduce support units or an object support apparatus that would enable access to multiple surfaces while minimizing the impact on any surface that has not dried. This apparatus would both ensure stable support for the object during the application process, as well as, allow the coatings of all surfaces to dry with minimal impact on the coated surface.

BRIEF SUMMARY OF THE INVENTION

An object of the present invention is to overcome the aforementioned drawbacks and to provide a system capable of supporting an object during application of surface coating that would enable access to multiple surfaces of the object while minimizing the impact on any surface that has not dried. Such a system would provide stable support for the object during the application process and would allow the coatings of all surfaces to dry with minimal effect on the coated surface.

In one embodiment of the invention, a system for supporting an object during application of surface coating comprises a plurality of support units. Each support unit comprises a base and a contact portion. Each base is adapted to rest stably upon a work platform and each contact portion is adapted to contact an underside of the object during application of surface coating. The plurality of support units together supports the object above the work platform.

Each support unit may comprise a cone, such that the base portion comprises a base of the cone and the contact portion comprises a vertex of the cone.

Each support unit may comprise a polyhedron, the polyhedron comprising a plurality of faces and at least one vertex. Each base portion may comprise one of a face or a plurality of vertices, and the contact portion may comprise at least one vertex.

The polyhedron may comprise a tetrahedron, the tetrahedron comprising four triangular faces. Alternatively, the polyhedron may comprise a tetrahedron that in turn comprises three triangular faces defining a hollow cavity, an edge of each of the three faces together defining an opening to the hollow cavity.

At least one vertex may have a curved exterior surface. At least one of the support units may further comprise means for securing the support unit to the work platform. The securing means may comprise at least one of: (1) a protrusion adapted to fit securely within a recess formed in the work platform; (2) a recess formed within the support unit to receive a support platform protrusion adapted to fit securely within the support unit recess; (3) a strap; or (4) a magnet.

The system may further comprise a plurality of spacer arms, each spacer arm connected to two support units and adapted to maintain a position of one support unit relative to one other support unit. The length of at least one spacer arm may be adjustable.

The work platform may comprise a rotating turntable, and the plurality of spacer arms may be affixed to the rotating turntable. The plurality of spacer arms may be affixed to the rotating turntable by means of a substantially centrally located hub and a plurality of peripherally located supports, each spacer arm affixed to the hub and one of the supports.

The system may further comprise a spacer frame connected to each of the support units and adapted to maintain a position of each support unit relative to each other support unit. The work platform may comprise a rotating turntable, and the spacer frame may be affixed to the rotating turntable.

Each of the support units may further comprise a cavity formed within the support unit, the cavity shaped to receive a portion of any other support unit such that one support unit can nest within another support unit.

Each of the support units may further comprise at least one flange extending outwardly from the base portion, the flange defining a through-hole for receiving a fastener capable of securing the support unit to the work platform.

Each of the support units may be affixed to the work platform, and may be movably affixed to the work platform. The support units and work platform may be configured to raise, lower, tilt, or spin.

Each support unit may further comprise three triangular faces defining a hollow cavity, an edge of each of the three triangular faces together defining an opening to the hollow cavity. The contact portion of each support unit may comprise a vertex formed by a junction of the three triangular faces. The vertex may have a curved exterior surface.

In addition to the system for supporting an object during application of surface coating as described above, other aspects of the present invention are directed to corresponding methods for supporting an object during application of surface coating.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1*a*-1*d* illustrate a support unit, in accordance with an embodiment of the invention;

FIG. 2 illustrates support units and an object being supported, in accordance with an embodiment of the invention;

FIGS. 3*a*-3*c* illustrate support units and an object being supported, in accordance with an alternative embodiment of the invention;

FIGS. 4*a*-4*c* illustrate a support unit and an object being supported, in accordance with an alternative embodiment of the invention;

FIGS. 5*a*-5*c* illustrate a support unit and an object being supported, in accordance with an alternative embodiment of the invention;

FIGS. 6*a*-6*b* illustrate a support unit, in accordance with an alternative embodiment of the invention;

FIGS. 7*a*-7*d* illustrate a support unit, in accordance with an alternative embodiment of the invention;

FIGS. 8*a*-8*c* illustrate a support system comprising support units and a support structure, in accordance with an embodiment of the invention;

FIGS. 9*a*-9*d* illustrate support systems comprising support units and a support structure, in accordance with alternative embodiments of the invention;

FIGS. 10*a*-10*c* illustrate a support system comprising support units and individual support members, in accordance with an embodiment of the invention;

FIGS. 11*a*-11*d* illustrate support members, in accordance with two alternative embodiments of the invention;

FIGS. 12*a*-12*d* illustrate support systems comprising support units and individual support members, in accordance with alternative embodiments of the invention;

FIGS. 13*a*-13*d* illustrate mechanisms for coupling of one or more support members or a support structure to one or more support units, in accordance with two alternative embodiments of the invention;

FIGS. 14*a*-14*d* illustrate a support unit capable of being affixed or aligned to one or more work surfaces, in accordance with an alternative embodiment of the invention;

FIGS. 15*a*-15*d* illustrate a support unit capable of being affixed or aligned to one or more work surfaces, in accordance with an alternative embodiment of the invention;

FIGS. 16*a*-16*b* illustrate a support unit capable of being affixed or aligned to a work surface, in accordance with an alternative embodiment of the invention;

FIGS. 17*a*-17*d* illustrate a support unit, in accordance with an alternative embodiment of the invention;

FIGS. 18*a*-18*d* illustrate a support unit, in accordance with an alternative embodiment of the invention;

FIGS. 19*a*-19*d* illustrate a support unit, in accordance with an alternative embodiment of the invention;

FIGS. 20*a*-20*b* illustrate a support unit, in accordance with an alternative embodiment of the invention;

FIGS. 21*a*-21*b* illustrate a support unit, in accordance with an alternative embodiment of the invention;

FIGS. 22*a*-22*d* illustrate a support unit, in accordance with an alternative embodiment of the invention;

FIG. 23 illustrates nesting of support units, in accordance with an embodiment of the invention;

FIGS. 24*a*-24*b* illustrate a support unit and attachment mechanism, in accordance with an alternative embodiment of the invention;

FIGS. 25*a*-25*b* illustrate a support unit and attachment mechanism, in accordance with an alternative embodiment of the invention;

FIG. 26 illustrates two support units secured to a sawhorse, in accordance with an alternative embodiment of the invention;

FIG. 27 illustrates a support unit and attachment mechanism, in accordance with an alternative embodiment of the invention;

DETAILED DESCRIPTION OF THE INVENTION

The present invention relates to systems and methods for supporting objects during the application of surface coatings. Many specific details of preferred embodiments of the invention are set forth in the following description and in the figures to provide a thorough understanding of such embodiments. One skilled in the art, however, will understand that the present invention may have additional embodiments, or that the present invention may be practiced without several of the details described in the following description. As such, this invention should not be construed as limited to the embodiments set forth herein; rather, these embodiments are provided so that this disclosure will be thorough and complete, and will fully convey the scope of the invention to those skilled in the art. Like numbers refer to like elements throughout.

In general, the systems and methods in accordance with the present invention provide two key features in its use. The first key feature of the apparatus is the creation of a stable base for the object receiving the surface coating to ensure that standard application techniques can be used. There are a plurality of standard application techniques that are well understood by one skilled in the art, including, but not limited to, application with a brush, application with a roller and application with a spraying device.

The second key feature of the apparatus is the minimization of contact with any surface of the object that has or will be receiving surface coating. This minimization of contact results in a minimal impact on the surface coating that has been applied. Ideally, the contact is minimized to the point where any effects on the object's surface are acceptable. Alternatively, the contact point may require minimal rework to establish the desired surface coating characteristics.

While there is a plurality of shapes capable of providing the features described above, FIGS. 1*a*-1*d* show four views (isometric, front, top and back views, respectively) of one shape for a support unit 101 that provides the features outlined previously. The embodiment shown is commonly referred to as a regular tetrahedron, which is a polyhedron composed of four equilateral triangular faces, with three of those faces meeting at each vertex. This regular tetrahedron may also be termed a triangular or three-sided pyramid. A pyramid has a base comprising any regular polygon and sides comprising isosceles triangles with a common vertex. A pyramid is typically named according to the polygon that comprises its base (e.g., square pyramid, hexagonal pyramid, etc.). Although only a triangular pyramid (i.e., tetrahedron) is illustrated, any suitable pyramid may be used in embodiments of the invention.

Figure 1A:
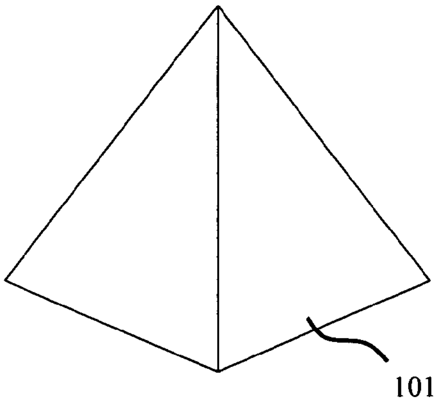
Figure 1B:
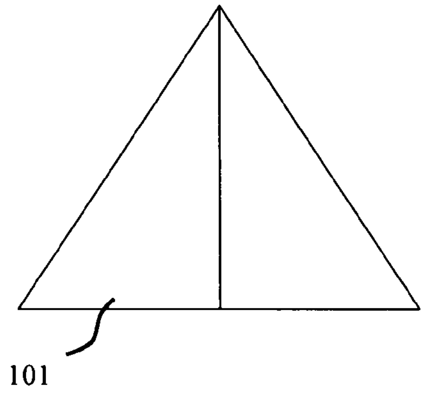
Figure 1C:
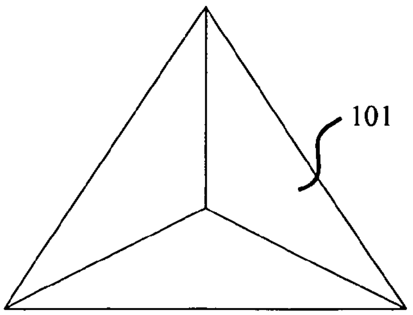
Figure 1D:
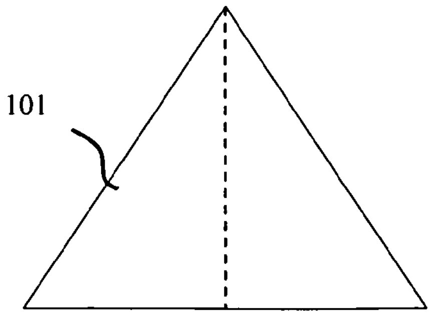
Figure 2:
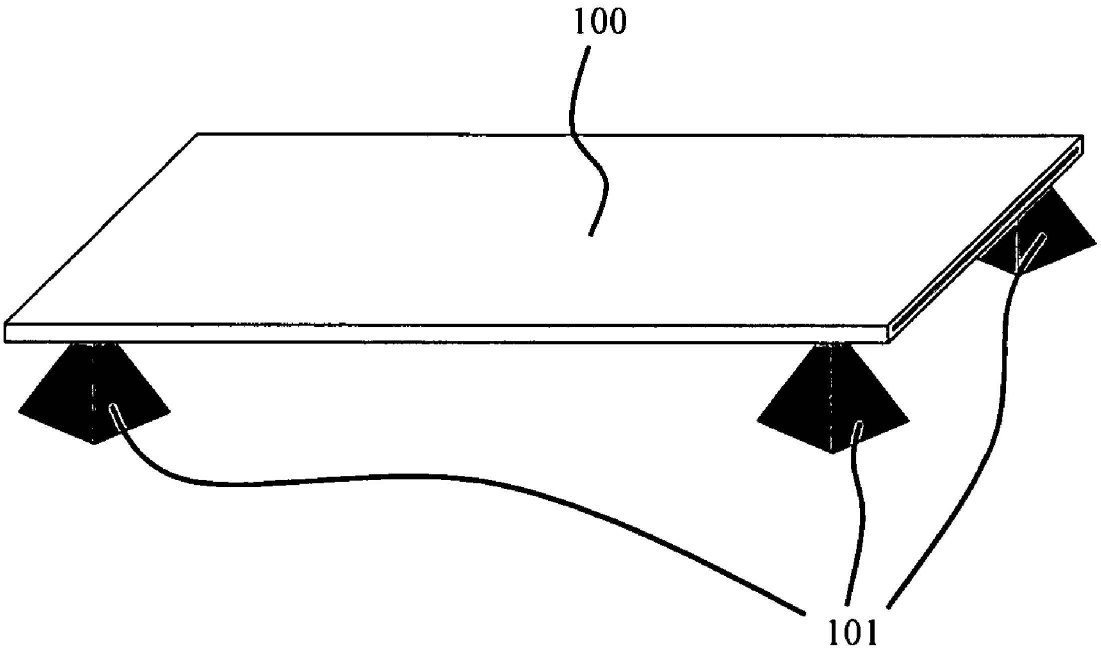

FIG. 2 demonstrates an isometric view of one embodiment of this invention in which multiple individual support units 101 are arranged in a formation to provide support to an object 100 receiving one or more surface coatings. As can readily be appreciated from FIG. 2, a coating may be applied to the surface of 100 that is initially opposite the support units. Without waiting for the coating to dry, object 100 may be flipped over such that the coated surface is placed in contact with the support units and the surface that was initially opposite the support units may be coated. The small contact points of the support units should only minimally affect the still-wet coating on the first-coated surface.

Alternate embodiments may include any suitable polyhedron. A polyhedron is a three-dimensional shape comprising a finite number of polygonal faces, the faces meet in straight-line segments called edges, and the edges meet in points called vertices. Such polyhedra of alternative embodiments may include all uniform polyhedra which are comprised of regular faces and congruent vertices. For these polyhedra (whether uniform or not), one or more faces, edges, and/or vertices could provide the stable base or the contact to the surface of the object receiving the surface coating. It is generally recognized that seventy-five such uniform polyhedra exist, as well as two infinite families of prisms and antiprisms, all of which may be used in alternative embodiments of the invention. These polyhedra, prisms, and antiprisms are described in *The Uniform Polyhedra*, MathConsult Dr. R. Mader, available at http://www.mathconsult.ch/showroom/unipoly/, the contents of which are incorporated herein in its entirety. These uniform polyhedra, prisms, and antiprisms are listed in Table 1 below.

TABLE 1

| Polyhedron Name | Symmetry Group | Wythoff Symbol |
|---|---|---|
| tetrahedron | Tetrahedral | (3\|2 3) |
| truncated tetrahedron | Tetrahedral | (2 3\|3) |
| octahemioctahedron | Tetrahedral | (3/2 3\|3) |
| tetrahemihexahedron | Tetrahedral | (3/2 3\|2) |
| octahedron | Octahedral | (4\|2 3) |
| cube | Octahedral | (3\|2 4) |
| cuboctahedron | Octahedral | (2\|3 4) |
| truncated octahedron | Octahedral | (2 4\|3) |
| truncated cube | Octahedral | (2 3\|4) |
| rhombicuboctahedron | Octahedral | (3 4\|2) |
| truncated cuboctahedron | Octahedral | (2 3 4\|) |
| snub cube | Octahedral | (\|2 3 4) |
| small cubicuboctahedron | Octahedral | (3/2 4\|4) |
| great cubicuboctahedron | Octahedral | (3 4\|4/3) |
| cubohemioctahedron | Octahedral | (4/3 4\|3) |
| cubitruncated cuboctahedron | Octahedral | (4/3 3 4\|) |
| great rhombicuboctahedron | Octahedral | (3/2 4\|2) |
| small rhombihexahedron | Octahedral | (3/2 2 4\|) |
| stellated truncated hexahedron | Octahedral | (2 3\|4/3) |

TABLE 1-continued

| Polyhedron Name | Symmetry Group | Wythoff Symbol |
|---|---|---|
| great truncated cuboctahedron | Octahedral | (4/3 2 3\|) |
| great rhombihexahedron | Octahedral | (4/3 3/2 2\|) |
| icosahedron | Icosahedral | (5\|2 3) |
| dodecahedron | Icosahedral | (3\|2 5) |
| icosidodecahedron | Icosahedral | (2\|3 5) |
| truncated icosahedron | Icosahedral | (2 5\|3) |
| truncated dodecahedron | Icosahedral | (2 3\|5) |
| rhombicosidodecahedron | Icosahedral | (3 5\|2) |
| truncated icosidodechedon | Icosahedral | (2 3 5\|) |
| snub dodecahedron | Icosahedral | (\|2 3 5) |
| small ditrigonal icosidodecahedron | Icosahedral | (3\|5/2 3) |
| small icosicosidodecahedron | Icosahedral | (5/2 3\|3) |
| small snub icosicosidodecahedron | Icosahedral | (\|5/2 3 3) |
| small dodecicosidodecahedron | Icosahedral | (3/2 5\|5) |
| small stellated dodecahedron | Icosahedral | (5\|2 5/2) |
| great dodecahedron | Icosahedral | (5/2\|2 5) |
| dodecadodecahedron | Icosahedral | (2\|5/2 5) |
| truncated great dodecahedron | Icosahedral | (2 5/2\|5) |
| rhombidodecadodecahedron | Icosahedral | (5/2 5\|2) |
| small rhombidodecahedron | Icosahedral | (2 5/2 5\|) |
| snub dodecadodecahedron | Icosahedral | (\|2 5/2 5) |
| ditrigonal dodecadodecahedron | Icosahedral | (3\|5/3 5) |
| great ditrigonal dodecicosidodecahedron | Icosahedral | (3 5\|5/3) |
| small ditrigonal dodecicosidodecahedron | Icosahedral | (5/3 3\|5) |
| icosidodecadodecahedron | Icosahedral | (5/3 5\|3) |
| icositruncated dodecadodecahedron | Icosahedral | (5/3 3 5\|) |
| snub icosidodecadodecahedron | Icosahedral | (\|5/3 3 5) |
| great ditrigonal icosidodecahedron | Icosahedral | (3/2\|3 5) |
| great icosicosidodecahedron | Icosahedral | (3/2 5\|3) |
| small icosihemidodecahedron | Icosahedral | (3/2 3\|5) |
| small dodecicosahedron | Icosahedral | (3/2 3 5\|) |
| small dodecahemidodecahedron | Icosahedral | (5/4 5\|5) |
| great stellated dodecahedron | Icosahedral | (3\|2 5/2) |
| great icosahedron | Icosahedral | (5/2\|2 3) |
| great icosidodecahedron | Icosahedral | (2\|5/2 3) |
| great truncated icosahedron | Icosahedral | (2 5/2\|3) |
| rhombicosahedron | Icosahedral | (2 5/2 3\|) |
| great snub icosidodecahedron | Icosahedral | (\|2 5/2 3) |
| small stellated truncated dodecahedron | Icosahedral | (2 5\|5/3) |
| truncated dodecadodecahedron | Icosahedral | (5/3 2 5\|) |
| inverted snub dodecadodecahedron | Icosahedral | (\|5/3 2 5) |
| great dodecicosidodecahedron | Icosahedral | (5/2 3\|5/3) |
| small dodecahemicosahedron | Icosahedral | (5/3 5/2\|3) |
| great dodecicosahedron | Icosahedral | (5/3 5/2 3\|) |
| great snub dodecicosidodecahedron | Icosahedral | (\|5/3 5/2 3) |
| great dodecahemicosahedron | Icosahedral | (5/4 5\|3) |
| great stellated truncated dodecahedron | Icosahedral | (2 3\|5/3) |
| great rhombicosidodecahedron | Icosahedral | (5/3 3\|2) |
| great truncated icosidodecahedron | Icosahedral | (5/3 2 3\|) |
| great inverted snub icosidodecahedron | Icosahedral | (\|5/3 2 3) |
| great dodecahemidodecahedron | Icosahedral | (5/3 5/2\|5/3) |
| great icosihemidodecahedron | Icosahedral | (3/2 3\|5/3) |
| small retrosnub icosicosidodecahedron | Icosahedral | (\|3/2 3/2 5/2) |
| great rhombidodecahedron | Icosahedral | (3/2 5/3 2\|) |
| great retrosnub icosidodecahedron | Icosahedral | (\|3/2 5/3 2) |
| great dirhombicosidodecahedron | Icosahedral | (\|3/2 5/3 3 5/2) |
| pentagonal prism | Dihedral | (2 5\|2) |
| pentagonal antiprism | Dihedral | (\|2 2 5) |
| pentagrammic prism | Dihedral | (2 5/2\|2) |
| pentagrammic antiprism | Dihedral | (\|2 2 5/2) |
| pentagrammic crossed antiprism | Dihedral | (\|2 2 5/3) |

Alternate embodiments of the invention may include a plurality of combinations or modifications of one or more of these polyhedra to create a unique object that includes the features previously discussed. Additional embodiments may include additional geometric solids, such as cones, prisms, cylinders and spheres, that may be used independently, or that may be modified or combined with one another to produce a unique support unit that provides the necessary functionality.

Figure 3A:
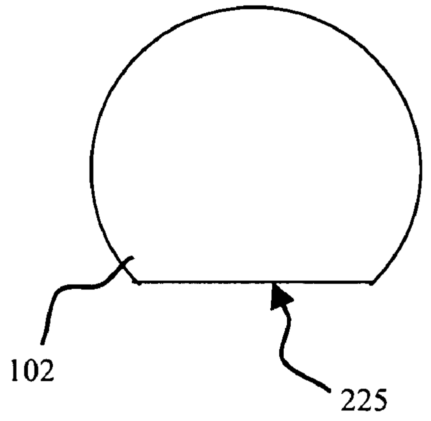
Figure 3B:
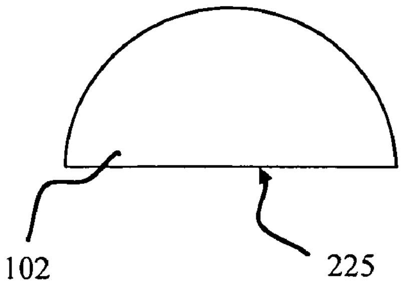

FIGS. 3*a* and 3*b* demonstrate two embodiments of a geometric solid that has been modified to be used as a support unit 102. FIGS. 3*a* and 3*b* demonstrate embodiments in which a portion of a sphere has been flattened to provide a stable base

Figure 3C:
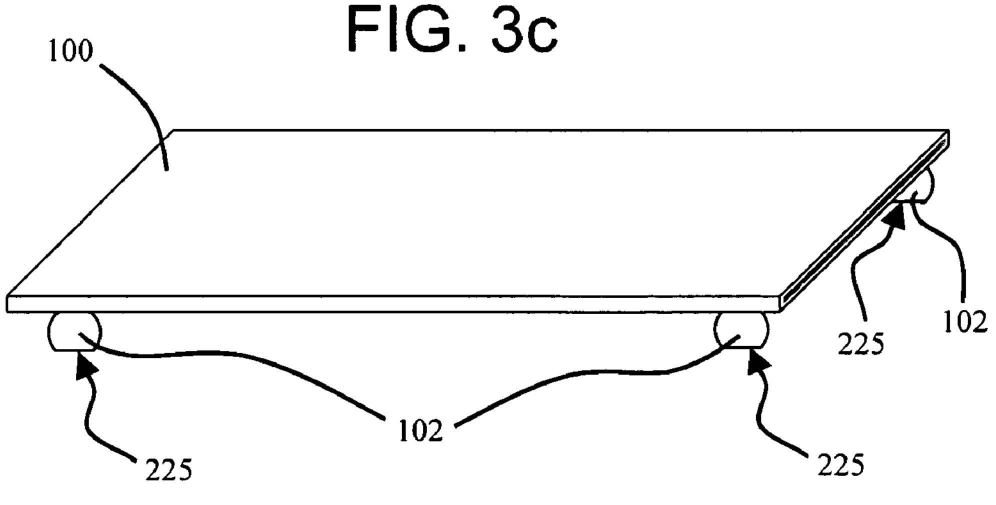

225 for the support unit 102. The curved surface of the sphere that is opposite of the flattened surface 225 would provide minimal contact with the object receiving one or more surface coatings while supporting the object. In the embodiment of FIG. 3*a*, flattening a portion of a sphere produces a solid shape that corresponds to more than half of a sphere. In the embodiment of FIG. 3*b*, flattening a portion of a sphere produces a solid shape that corresponds to a hemisphere (i.e., half of a sphere). In an alternate embodiment not illustrated, flattening a portion of a sphere produces a solid shape that corresponds to less than half of a sphere. FIG. 3*c* shows an isometric view of multiple support units 102 of FIG. 3*a* supporting an object 100 receiving surface coating.

FIGS. 4*a*, 4*b* and 4*c* demonstrate another embodiment of a geometric solid that has been modified to be used as a support unit 103. FIG. 4*a* shows an isometric view and FIG. 4*b* shows a front view of a cube 103 that has been modified by eliminating one or more of the vertices and replacing the vertex with a flattened plane 226. The support unit 103 would utilize the flattened plane 226 as a stable base and the vertex opposite the flattened plane would provide minimal contact with the object 100 receiving the surface coating, as shown in FIG. 4*c*.

Figure 5A:
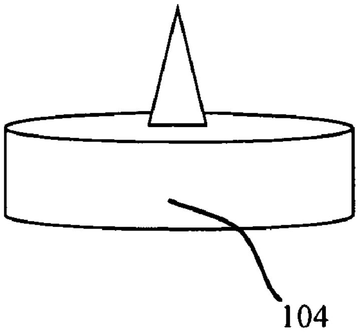
Figure 5B:
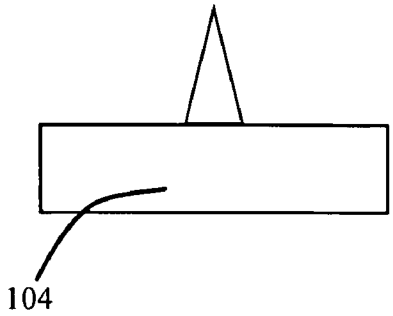
Figure 5C:
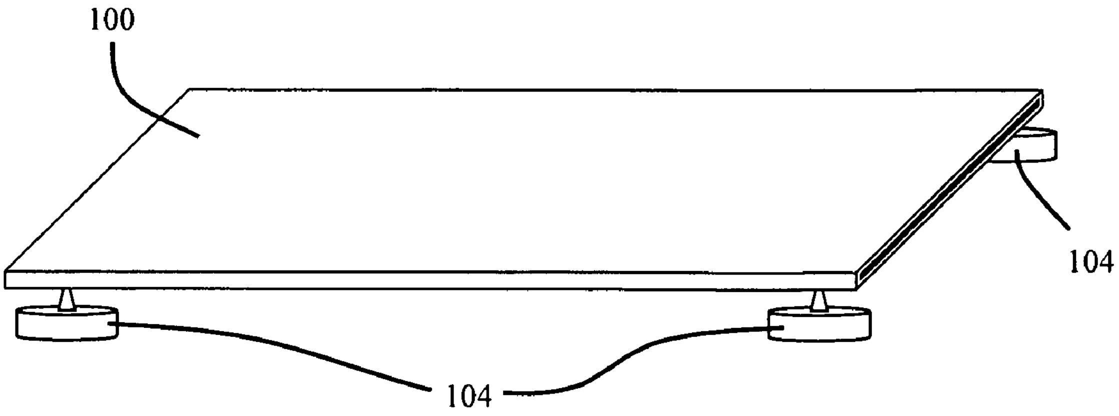

FIGS. 5*a*, 5*b* and 5*c* demonstrate another embodiment of a geometric solid that has been modified to be used as a support unit 104. FIG. 5*a* shows an isometric view and FIG. 5*b* shows a front view of support unit 104 which is a combination of a cylinder and a cone. In this embodiment, the cylinder provides the stable base for the support unit 104 and the cone provides minimal contact with the object receiving the surface coating. FIG. 5*c* shows an isometric view of multiple support units 104 supporting an object 100 receiving surface coating.

Figure 6A:
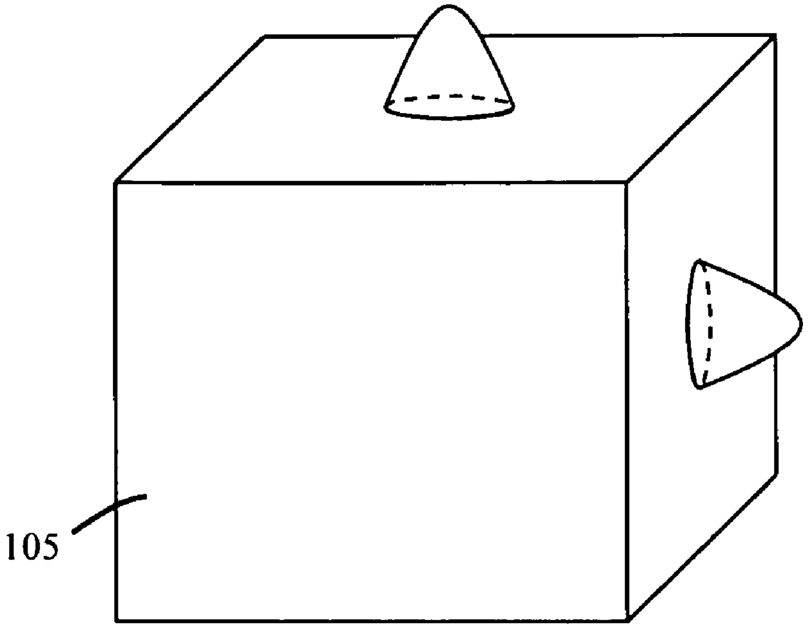
Figure 6B:
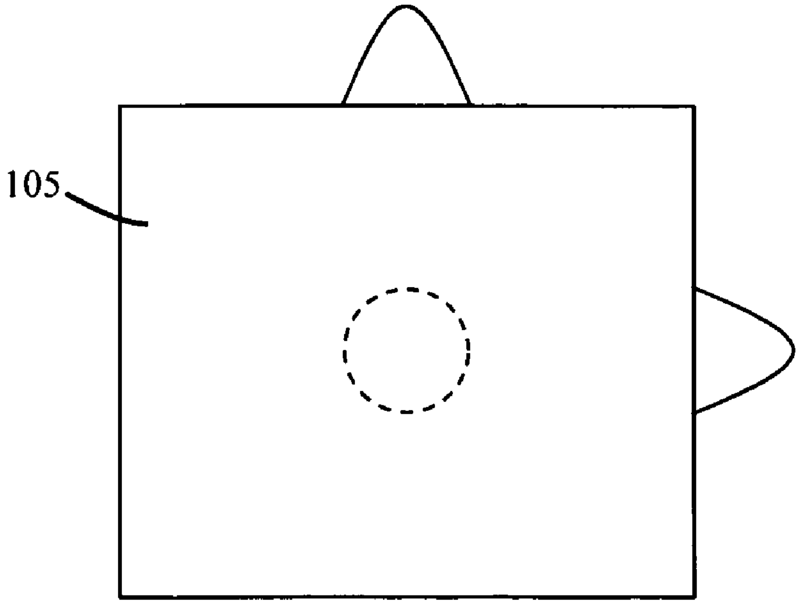

FIGS. 6*a* and 6*b* demonstrate another embodiment of a geometric solid that has been modified to be used as a support unit 105. FIG. 6*a* shows an isometric view and FIG. 6*b* shows a front view of support unit 105 which is a cube having a rounded protrusion added to one or more sides. In this embodiment, the cube provides the stable base for the support unit 105 and the protrusion provides minimal contact with an object receiving the surface coating.

Alternate embodiments may include modifications to the polyhedra including but not limited to the flattening, rounding or elimination of one or more face, edge or vertex. The support unit 106 shown in FIGS. 7*a* 7*b*, 7*c* and 7*d* (isometric, front, top and side views, respectively) shows an embodiment in which the vertices of a regular tetrahedron have been rounded.

Additional embodiments may include the combination of support units with a support structure or support members to create a support system. This system could be utilized to increase the stability of the support units. Additionally this system may aid in establishing consistent relative positioning between two or more support units.

FIGS. 8*a*, 8*b* and 8*c* (top, front and side views, respectively) demonstrate an embodiment in which the support system 200 comprises a combination of a support structure 201 and one or more support units 101 connected to the support structure.

FIGS. 9*a*, 9*b*, 9*c* and 9*d* demonstrate four alternate embodiments of a support system containing a structure 201 with one or more support units 101 connected to each independent structure. These embodiments demonstrate a plurality of different support systems that may be used to support objects of various shapes and sizes.

FIG. 9*a* demonstrates an embodiment of a square system comprising four support units 101 and a square independent structure 201 which may be useful for supporting square objects. FIG. 9*b* demonstrates an embodiment of a rectangular system comprising six support units 101 and a rectangular independent structure 201 which may be useful for supporting larger rectangular objects, such as doors. FIG. 9*c* demonstrates an embodiment of a triangular system comprising three support units 101 and a triangular independent structure 201 which may be useful for supporting objects with the fewest possible number of touch points on the object being supported. This triangular apparatus may be useful in situations where coating materials are being applied with minimal pressure on the object being coated, such as by using a spray device. FIG. 9*d* demonstrates an embodiment of a pentagonal system comprising five support units 101 and a pentagonal independent structure 201 which would be useful for supporting objects that are round, such as table tops.

FIGS. 10*a*, 10*b* and 10*c* (top, front and side views, respectively) demonstrate an embodiment in which individual support members 202 are attached to one or more support units 101, thereby in conjunction with the support unit creating a support system 200.

Support structure 201 or structural members 202 can be constructed according to predefined, fixed dimensions, thereby enabling support systems having fixed distances between the support units. Alternatively, support structure 201 or structural members 202 may be constructed to enable dimensional adjustment (e.g., increase or decrease of the length) of the support structure or members, thereby enabling a user to adjust the distances between the support units 101.

Figure 11A:
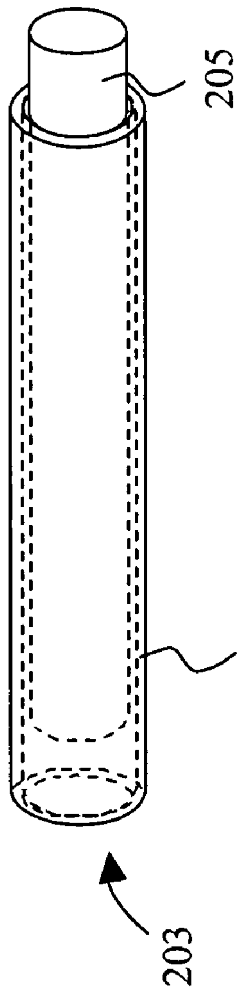
Figure 11B:
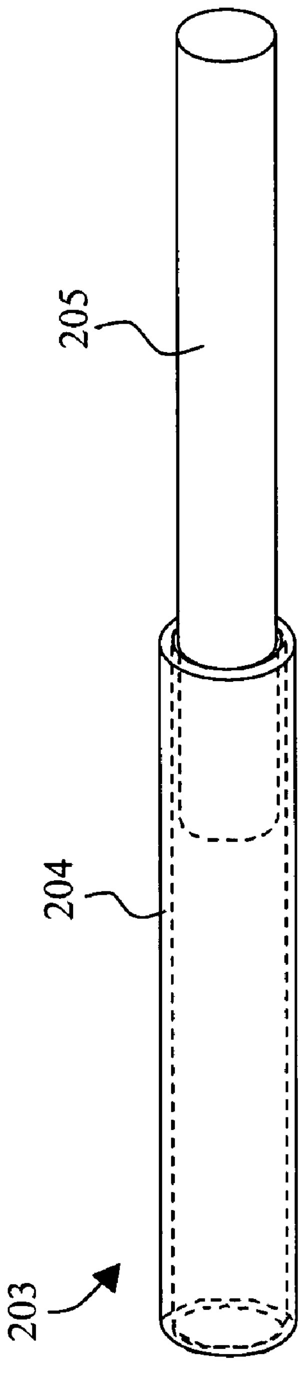

While a plurality of options exist for enabling a user to adjust the length of a support member, two alternative embodiments are described herein. Additional options for length adjustment, known to one skilled in the art, are considered to be within the scope of the present invention. FIGS. 11*a* and 11*b* demonstrate an embodiment of a telescoping support member. FIG. 11*a* demonstrates a telescoping member that has not been extended. FIG. 11*b* demonstrates a telescoping member that has been extended. These figures demonstrate the general approach of telescoping members in which the support member is made of two or more individual parts. Generally, there is an inner part 205 that provides the core to the telescoping member. This core 205 may be hollow or solid. This core is generally surrounded by one or more sleeves 204 that slide over the core. In alternate embodiments, three or more sleeves can be nested together to provide greater telescoping length. There exists a plurality of mechanisms, known to those skilled in the art, that can be used to lock the sleeve 204 in a given position on the core 205. FIGS. 11*a* and 11*b* show a support member that is round. There exists a plurality of shapes for the core and sleeves, known to those skilled in the art, which may be used for alternative embodiments of the invention.

Figure 11C:
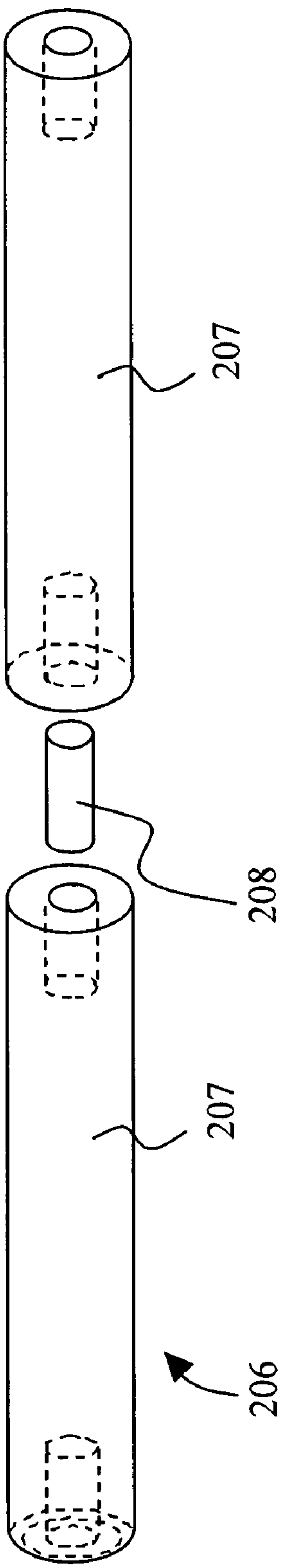
Figure 11D:
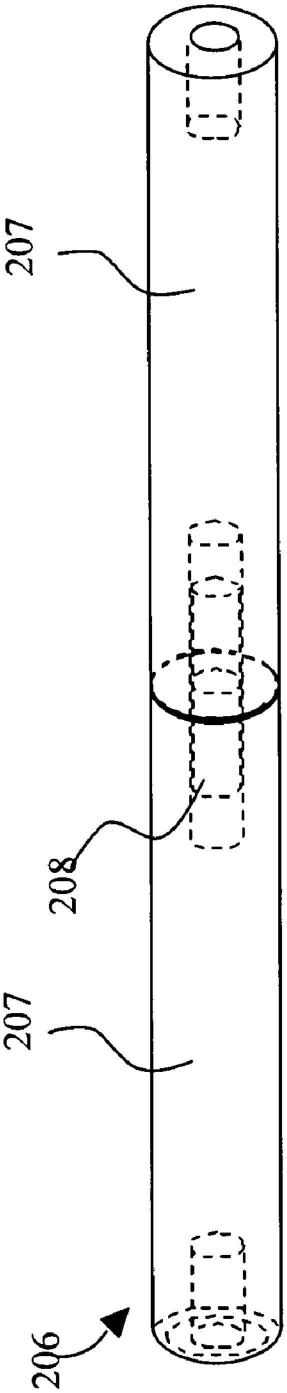

FIGS. 11*c* and 11*d* demonstrate another embodiment for enabling a user to modify the length of support members. In this embodiment, two or more support members 207 are connected to one another to extend the aggregate length of the support member. The members are connected by using one or more pins 208 that fit into the two or more support members 207.

There exists a plurality of other mechanisms that can be used to connect two support members together. The mechanisms are generally well known by one skilled in the art and would include but not be limited to a mechanism to screw two or more members together. An additional embodiment would be a sleeve that fits over one or more support members and permanently or temporarily attaches to one or more of those members.

FIGS. 12*a*, 12*b*, 12*c* and 12*d* demonstrate four alternative embodiments of a support system 200 containing one or more support members 202 with one or more support units 101 connected to each support member. These embodiments demonstrate a plurality of support systems that may be used to support objects of various shapes and sizes.

Figure 12B:
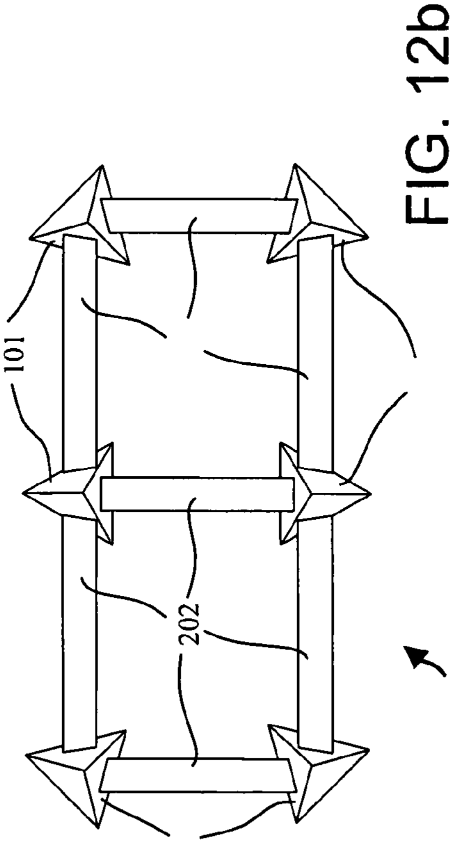
Figure 12A:
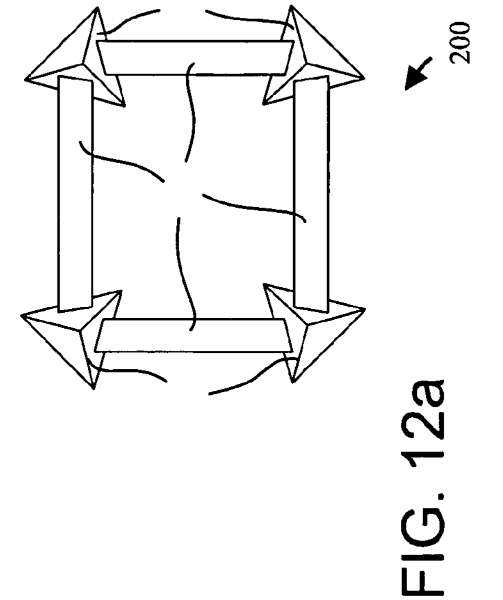
Figure 12D:
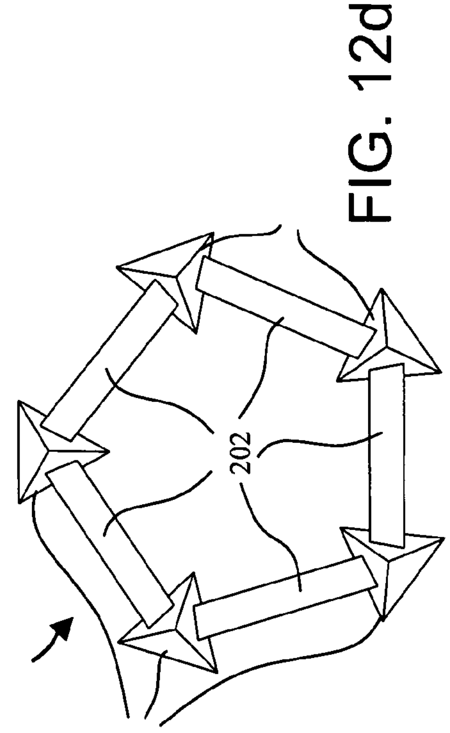
Figure 12C:
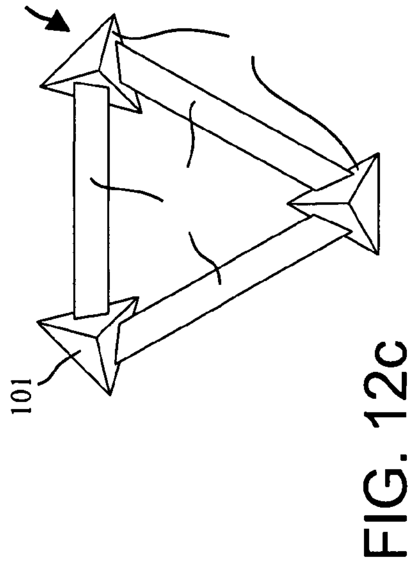

FIG. 12*a* demonstrates an embodiment of a square system 200 comprising four support units 101 and four support members 202 which may be useful for supporting square objects. FIG. 12*b* demonstrates an embodiment of a rectangular system comprising six support units 101 and seven support members 202 which may be useful for supporting larger rectangular objects, such as doors. FIG. 12*c* demonstrates an embodiment of a triangular system comprising three support units 101 and three support members 202 which may be useful for supporting objects with the fewest possible number of touch points on the object being supported. This triangular system would be useful in situations where coating materials are being applied with minimal pressure on the object being coated, such as by using a spray device. FIG. 12*d* demonstrates an embodiment of a pentagonal system comprising five support units 101 and five support members 202 which may be useful for supporting objects that are round, such as table tops.

The connection of the support structure 201 or the support members 202 to support units 101 can either be temporary or permanent. Temporary connection can be accomplished through a plurality of approaches. In one embodiment, the support structure 201 or support members 202 could be attached with suction cups to a flat surface of the support units 101. Additional embodiments may include, but not be limited to, press fitting and/or the use of mechanical fasteners (e.g., screws, nuts and bolts, etc. . . . ).

In another embodiment, the support structure 201 or individual support members 202 could be permanently attached to the support units 101. There is a plurality of methods for establishing a permanent attachment including, but not limited to, chemical bonding using glue.

Figure 13A:
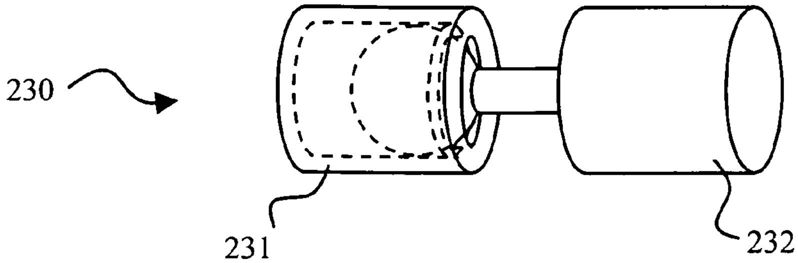
Figure 13B:
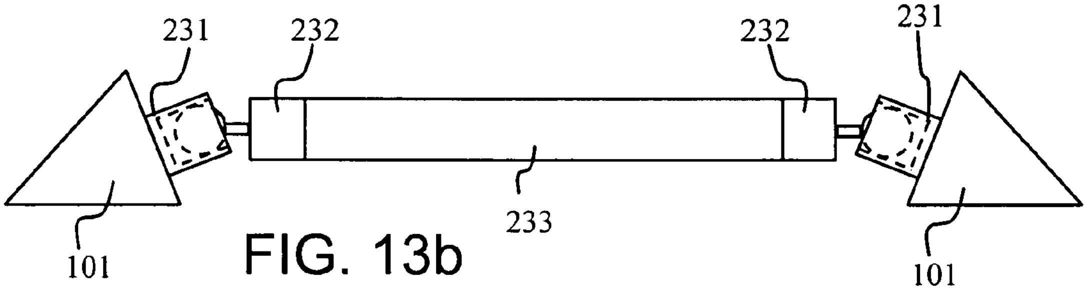

Another embodiment of this invention comprises adjustable linkages between the support units and support members. This embodiment is beneficial in using support members in multiple configurations with the support units. Different configurations would typically require different angles between the support members and support units, thereby limiting the utility of a support member that has fixed connector. FIGS. 13*a*, 13*b*, 13*c* and 13*d* demonstrate two approaches for enabling adjustable linkages. FIG. 13*a* demonstrates a "ball in socket" connector 230 that may be used to connect support units and support members or to connect support units and a support structure. This connector is made of two parts. The first part 231 has a socket that encloses the ball, which is one part of the second piece 232. FIG. 13*b* demonstrates the "ball in socket" of FIG. 13*a* being used in a support apparatus. In FIG. 13*b*, the socket part 231 may be attached to each support unit 101. As discussed above, there exists a plurality of approaches for establishing a temporary or permanent connection between first socket part and the support unit. The support member 233 has one of the ball part 232 attached at each end. Again, the ball part can be either permanently or temporarily attached to the support member. In an alternate embodiment, the socket part 231 may be attached to the support member and the ball part 232 may be attached to the support unit 101. Additional alternative embodiments may replace the support members with a support structure described above, with the support structure permanently or temporarily attached to the support unit using a ball and socket connector 230.

Figure 13C:
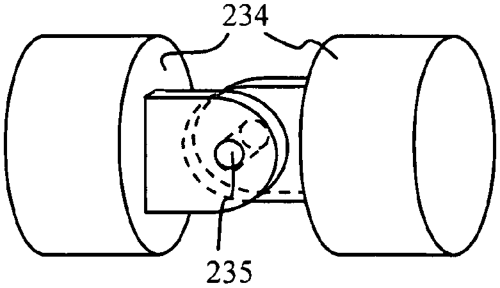
Figure 13D:
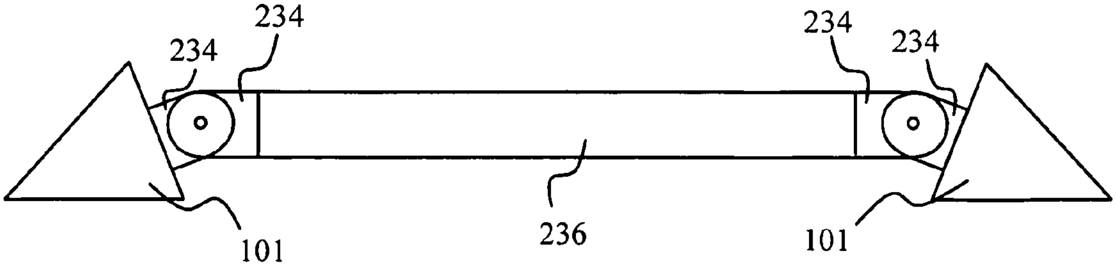

FIG. 13*c* demonstrates a hinged connector that may be used to connect support units and support members or to connect support units and a support structure. This connector generally comprises three parts. One each of hinge part 234 attaches to the support unit and either the support member or the support structure. These hinge parts 234 are typically held together by and pivot around a pin 235. FIG. 13*d* demonstrates the "hinge" of FIG. 13*c* being used in a support apparatus. In FIG. 13*d*, one hinge part 234 is attached to each support unit 101. As discussed above, there exists a plurality of approaches for establishing a temporary or permanent connection between hinge part 234 and support unit 101. The support member 236 has one hinge part 234 (i.e., the accompanying part to hinge part 234 attached to support unit 101) attached at each end. Again, hinge part 234 can be either permanently or temporarily attached to the support member 236. Additional alternative embodiments may replace the support members with a support structure described above, with the support structure permanently or temporarily attached to the support unit using a hinged connector as described above.

In another alternative embodiment, the support structure 201 and the support units 101 could comprise four separate support units and separate four support members. Alternatively, a support apparatus could be produced as a single piece.

FIGS. 14*a*, 14*b*, 14*c* and 14*d* demonstrate four views (respectively isometric, side, front with work surface, and top view) of an embodiment of the apparatus that enables support units 107, or an aggregate support system comprising support unit 107, to be affixed or aligned to one or more work surfaces 300 (e.g., a workbench). Affixing one or more support units or the aggregate support system to one or more work surfaces would provide greater stability to the support units or support system. Additionally, affixing one or more support units or the aggregate support system to one or more work surfaces would be beneficial in situations where it is desirable to precisely position the support units relative to the object receiving one or more surface coatings. In the embodiment shown in FIGS. 14*a*, 14*b*, 14*c* and 14*d*, a round peg 209 is added to the support unit 101 to comprise support unit 107. FIG. 14*c* demonstrates the utility of this feature in allowing a user to mount the support unit 107 to any surface 300 that has a hole of a corresponding size and shape to the peg 209.

Similar to the embodiment illustrated in FIGS. 14*a*-14*d*, FIGS. 15*a*, 15*b*, 15*c* and 15*d* demonstrate four views (respectively isometric, side, front with work surface, and top view) of an alternative embodiment in which a hole 210 would be formed in the support unit 101 to comprises support unit 108, thereby enabling the support unit 108 to be attached to any surface with a corresponding size and shape peg.

There are a plurality of additional embodiments similar to the peg 209 and hole 210 configurations of FIGS. 14*a*-14*d* and 15*a*-15*d* that would enable fastening of the support unit to a surface. These as well known to one skilled in the art and would include, but not be limited to, threading both the peg and the hole to produce a "nut and bolt" attachment, a key and keyhole configuration, or a "snap fit" connection.

There are a plurality of other techniques for attaching the support unit 101 to a surface 300 which include, but are not limited to, addition of attachment materials (e.g., hook and loop) or inclusion of a magnet in both or either the support unit 101 and/or the mounting surface 300. Additional embodiments for attaching to a work surface would include but not be limited to those embodiments previously discussed for attaching support units to support members or support structures.

Figure 16A:
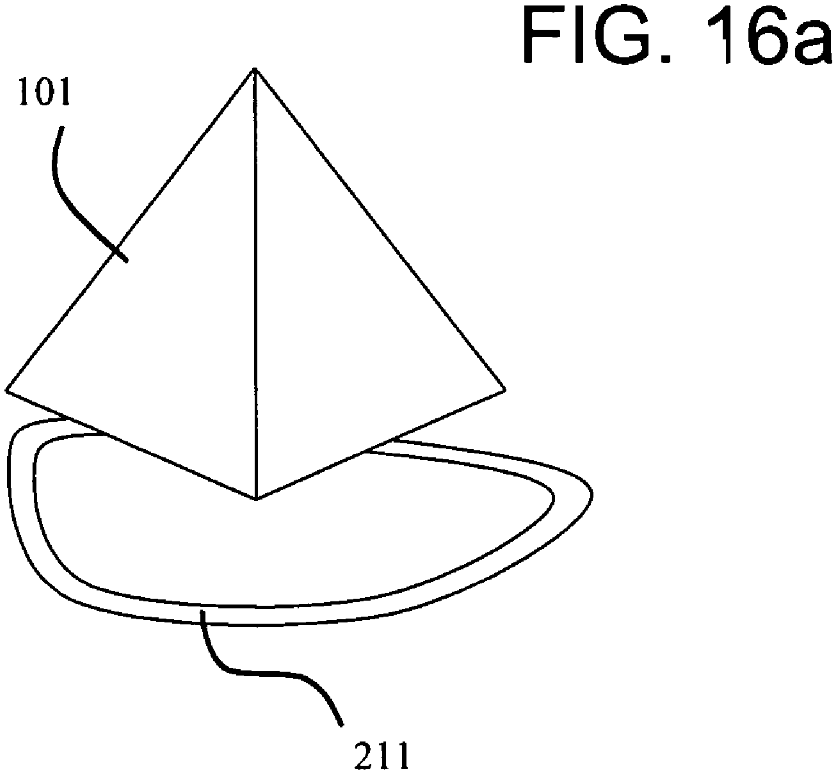
Figure 16B:
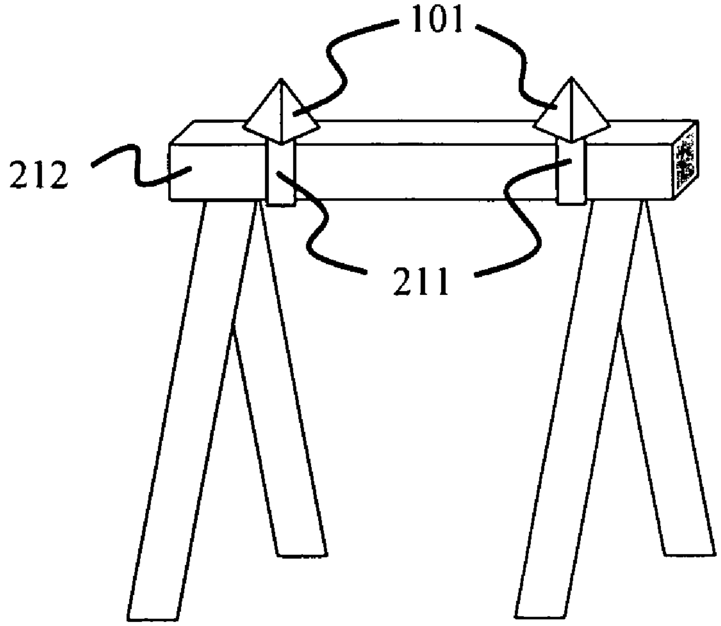
Figure 17A:
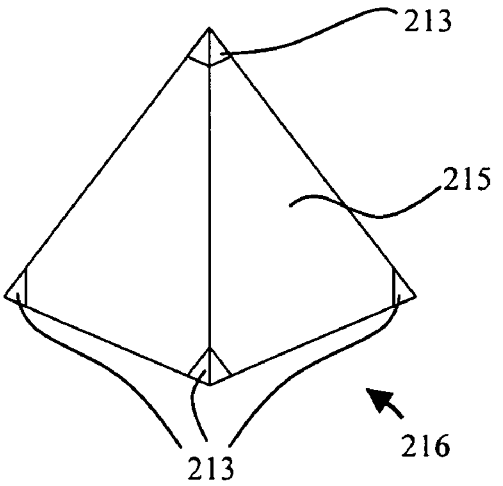
Figure 17B:
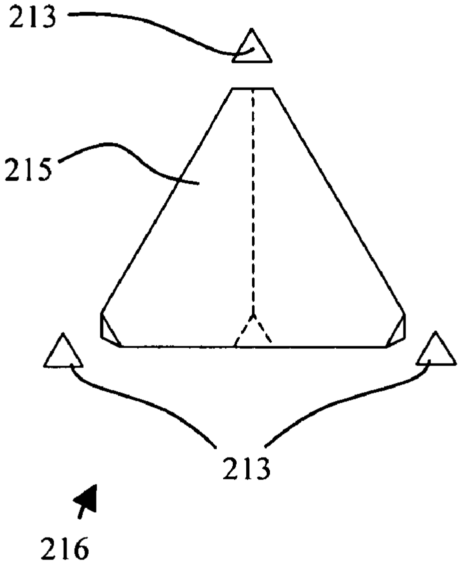
Figure 17C:
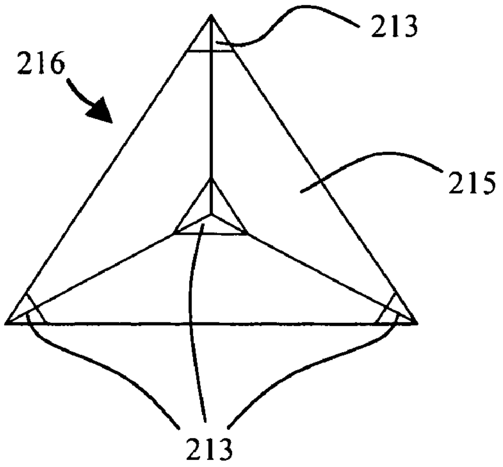
Figure 17D:
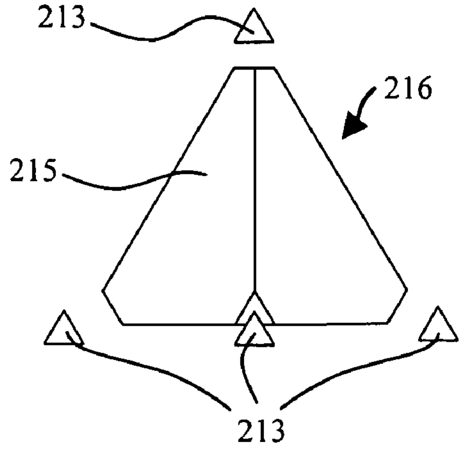
Figure 18A:
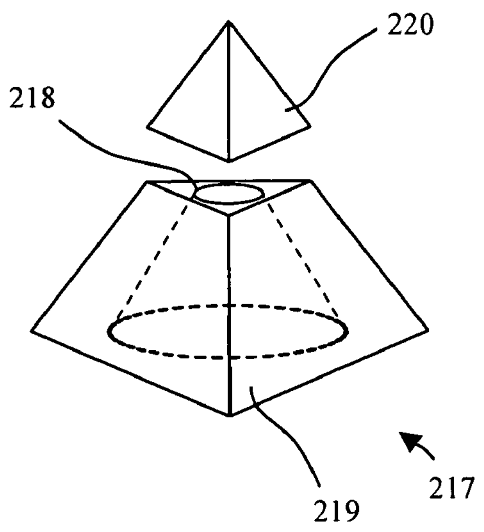
Figure 18B:
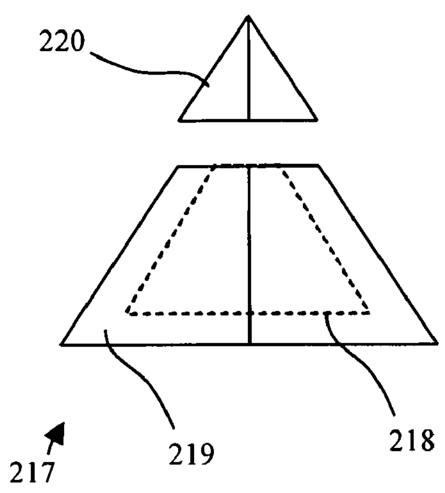
Figure 18C:
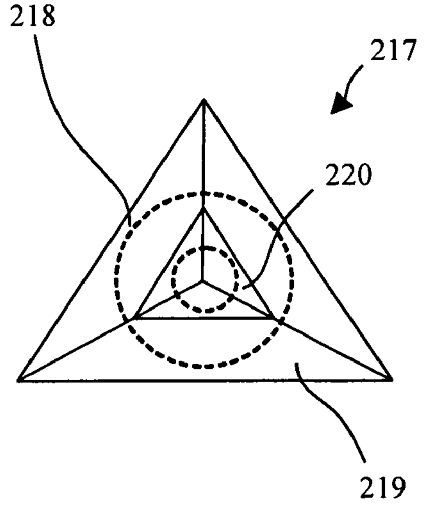
Figure 18D:
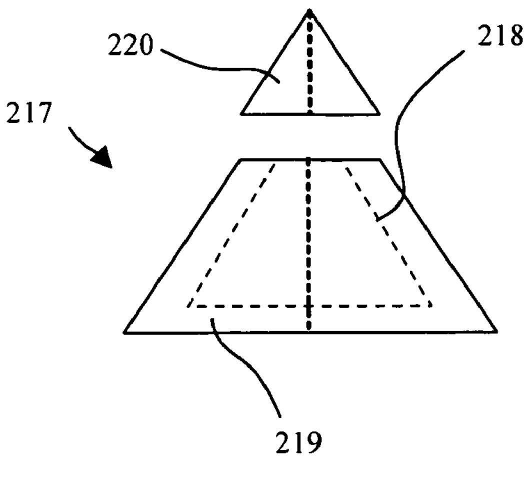

FIG. 16*a* demonstrates an additional alternative embodiment which would include attaching one or more straps 211 to the support unit 101 or aggregate support system which can be fastened to a plurality of support surfaces. A typical use of this type of mechanism, shown in FIG. 16*b*, would be to attach the support unit 101 to a sawhorse 212. There is a plurality of mechanisms for attaching an object using straps which include but are not limited to straps that snap or hook together, straps that have a belt buckle configuration, or straps that have a hook and loop fastening mechanism. In additional alternative embodiments, the strap can be made of material, such as coated wire, that deforms to enable fastening the support unit to a mounting surface or to another strap.

FIGS. 17*a*, 17*b*, 17*c* and 17*d* show four views (isometric, front, top and back views, respectively) of an embodiment of support unit 216 in which vertices 213 can be removed and/or replaced. The user of the support unit 216 may choose to remove the vertices due to excessive wear, to prevent accidental damage to the vertices, or reduce the probability that a user could be injured by the support unit 215. Additionally, the vertices 213 can be replaced with alternate vertices 213 that would enable the support unit to be tailored for a specialized use. One example of a specialized use would be to replace pointed vertices with rounded vertices when concerns exist about the pointed vertices scratching and/or creating an indention in the object receiving one or more coating material. This may be desirable in cases in which an object made of softer materials (e.g., balsa or other soft woods) is being coated.

There is a plurality of alterations to the removable vertices 213 that would allow the support unit 216 to be tailored for specialized use. These embodiments may include having the material of the removable vertices 213 being different than the material of support unit 215. This embodiment would allow for optimal use with different coating materials or for differences in materials being coated. For example, removable vertices made of rubber may be used when applying a coating to an object made of a softer wood). Additionally, the removable vertices 213 could have different shapes to allow for specialized use. One embodiment may include vertices 213 with rounded versus pointed contact points with the object being coated.

In an alternate embodiment, shown in FIGS. 18*a*, 18*b*, 18*c*, 18*d* (isometric, side, top and front view, respectively) and FIGS. 19*a*, 19*b*, 19*c* and 19*d* (isometric, side, top and front view, respectively), the support unit 217 or 221 could have, respectively, an open cavity 218 or 224 for storage. In this embodiment, the support unit 217 or 221 would have the capability of enclosing parts (e.g., a mounting strap or the removable vertices) within, respectively, the support unit 217 or 221. The capability could be enabled through a plurality of means including, but not limited to, having a primary piece 219 or 222 that defines the cavity and a secondary piece 220 or 223 that fastens to the primary piece to cover the cavity.

Figure 20A:
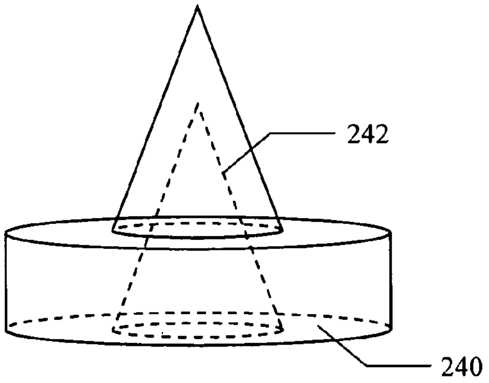
Figure 20B:
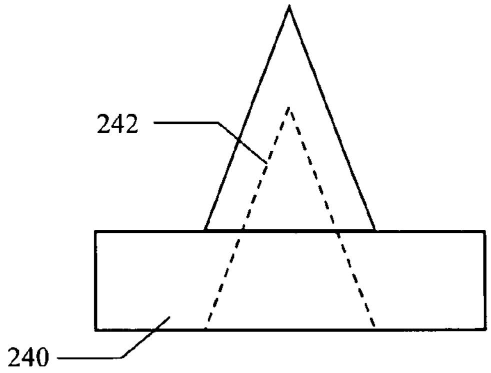

In an alternate embodiment, shown in FIGS. 20*a* and 20*b* (isometric and side view, respectively), the support unit 240 could have an open cavity 242 that enables the support unit to receive a portion of any other support unit such that one support unit can nest within another support unit. This nesting capability can be beneficial for storage of the support unit when not in use. Additionally, the nesting capability can enable the user to work with object of dissimilar heights wherein several stacked support units can be leveraged to reach higher portions of objects receiving surface coatings.

There is a plurality of materials that would allow individual pieces of or the entire support system to be tailored for specialized use. The materials that could potentially be used include plastics, metals, wood, ceramics, aggregates, crystalline structures, rubber or other pliable materials, magnets, and any other suitable material. For example, in one embodiment, all or parts of the structure may be fabricated from plastic. This embodiment would be applicable for many lighter weigh objects being supported. In an alternate embodiment, a steel support system may be beneficial for supporting heavy objects receiving surface coating, such as steel plates or stone surfaces. The material from which the support system is fabricated may be selected based on the desired structural properties (e.g., strength or rigidity), the desired surface properties (e.g., low or high coefficient of friction), and/or any other desired properties. The entire support system may be fabricated from a single material, or different parts of the support system may be fabricated from different materials.

In an alternate embodiment, the support system could be coated with a material to provide desired surface properties. For example, all or part of the support system may be coated with polytetrafluoroethylene (Teflon™) to reduce the propensity for the surface coating to stick. An additional embodiment may be to use a material that would have greater adhesion to the object receiving surface coating to reduce the propensity for that object to move while drying.

Figure 21A:
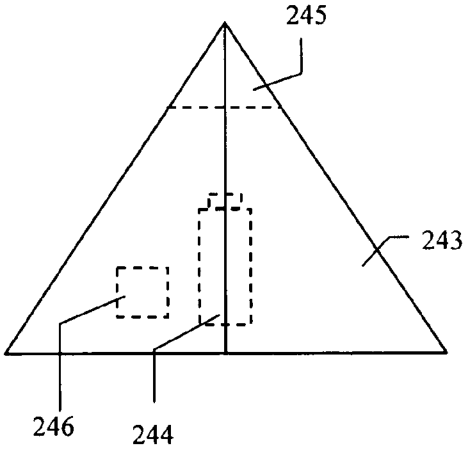
Figure 21B:
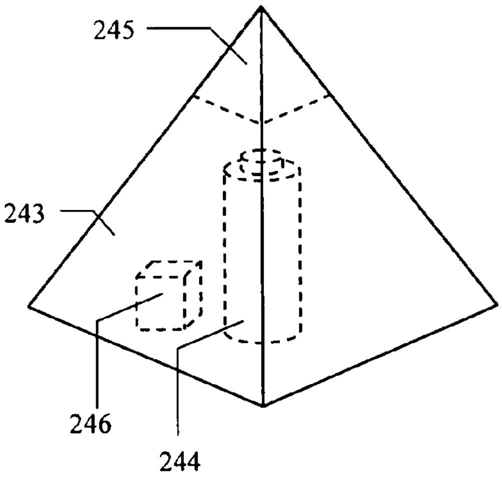

In an alternate embodiment, shown in FIGS. 21*a* and 21*b* (isometric and side view, respectively), the support unit 243 could partially or fully enclose a power unit 244 (e.g., battery) and one or more mechanical devices 245 (e.g., heating element or rotating element) and 246 (e.g., vibrating element). In this embodiment, the power unit and mechanical devices can produce one or more conditions that would be beneficial in the application or drying processes. Those conditions may include heating of a portion of the support system to change the adhesion properties of that system. Those conditions may also include creation of a rotating tip to reduce the adhesion between the object and the support system. In an additional embodiment, the power unit and mechanical device could cause the support system to vibrate thereby vibrating the object being supported. The vibration may be beneficial in producing desired surface or mechanical characteristics in the object receiving the surface coating or the surface coating itself.

Figure 23:
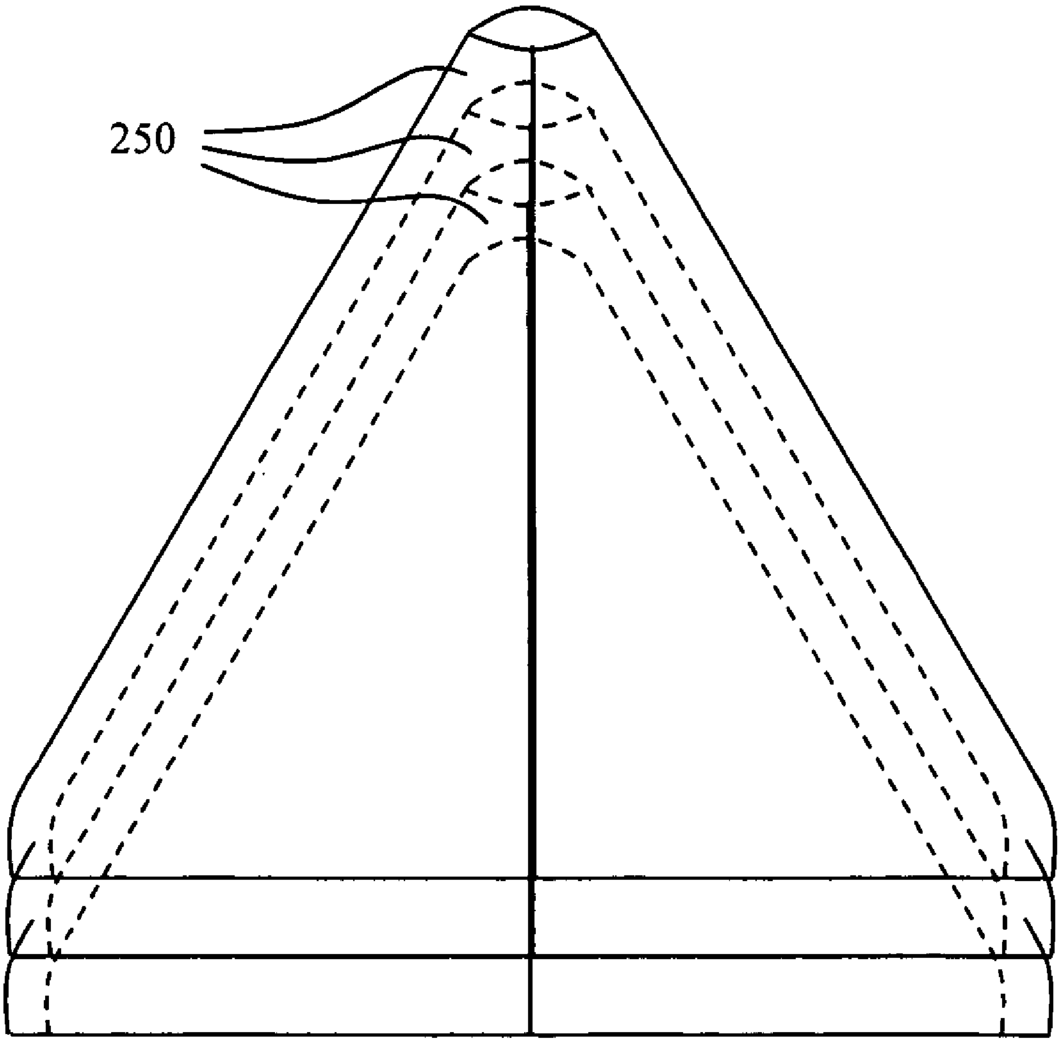
Figure 25A:
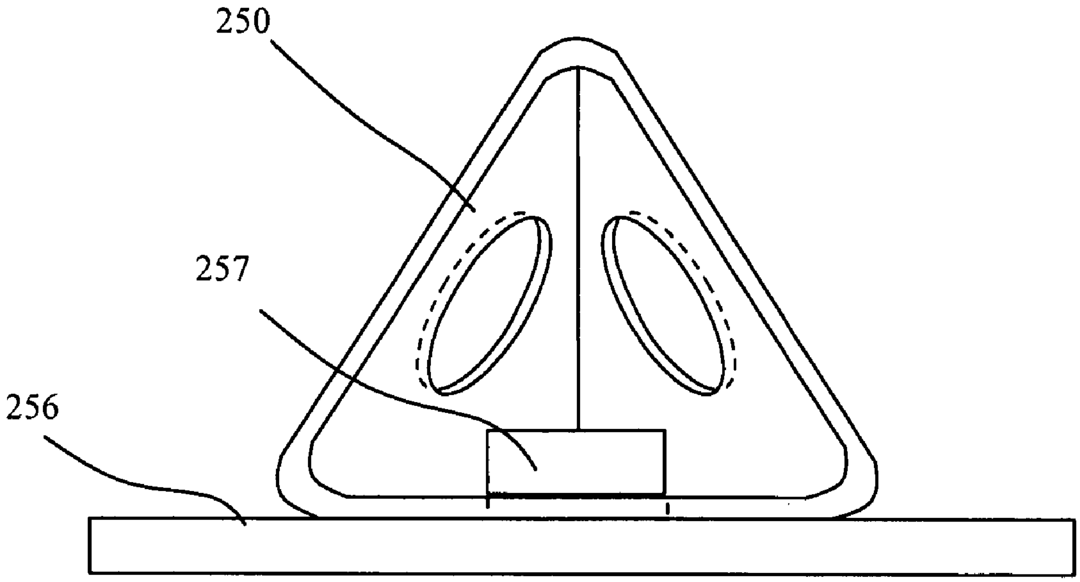
Figure 25B:
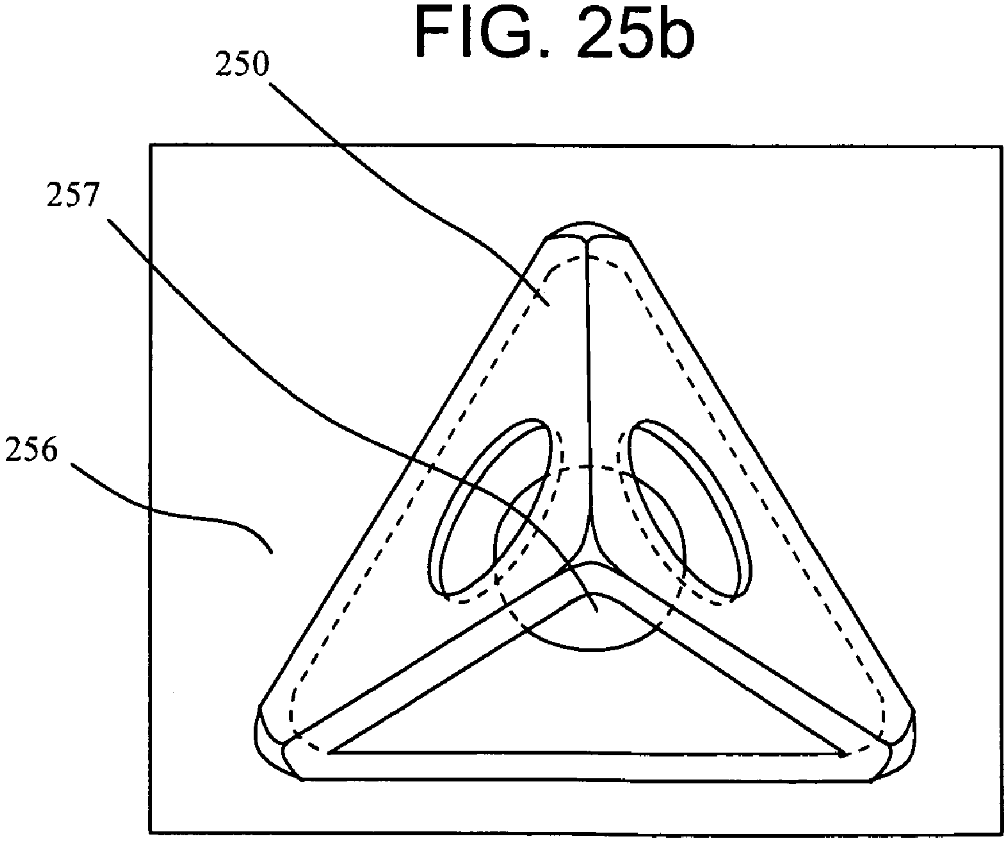

There exists a plurality of embodiments that can be developed by a combination of two or more of the features disclosed in this application. One common embodiment, shown in FIGS. 22*a*, 22*b*, 22*c*, 22*d* (isometric, side, top and front view, respectively), the support unit 250 could be a combination of a regular tetrahedron 251, with a hollow cavity 252 (not visible from these prospectives, but illustrated by a dashed line), one or more holes 253, rounded vertices 254 and/or rounded edges. In this embodiment, the hollow cavity in the support unit 250 enables two or more support units to be placed on top of one another (i.e., nested), as shown in FIG. 23, for storage purposes, to adjust the height of the support unit or to provide additional weight support capability. The hole in the side could enable attachment to support members or an independent support structure. Note that in FIGS. 22-26, holes that are partially or fully hidden from view are omitted for clarity. Additionally, the hole in the side could enable the support unit to be attached to a work surface, shown in FIGS. 24*a*, 24*b*, 25*a* and 25*b*, or to a sawhorse, shown in FIG. 26. FIGS. 24*a* and 24*b* (isometric and side views respectively) demonstrate the capability to have an attachment mechanism 255 that enables the support unit 250 to be mounted to a surface 256. Attachment mechanism 255 is shaped to fit snugly within the hollow cavity 252 of the support unit. The attachment mechanism may be securely attached (using any known permanent or temporary means of attachment) to the work surface 256, and the support unit 250 may then be placed on the attachment mechanism and thereby held securely in place and capable of supporting a surface to be coated. Alternatively, as shown in FIGS. 25*a* and 25*b* (side and top views respectively), an attachment mechanism 257 may be cylindrical. In such an embodiment, the support unit 250 can be placed so that one of the sides of the support unit 250 that has a hole can be resting on the work surface 256 and the attachment mechanism snugly fits within the hole to hold the support unit securely in place. Attachment to a sawhorse 259, shown in FIG. 25, could be facilitated by a strapping mechanism 258 that passes through or attaches to the holes in the support unit 250. The rounded vertices would enable the benefits previously discussed in this application.

In an alternative embodiment, illustrated in FIG. 27, the support unit 260 may comprise one or more flanges or tabs 262 that allows easy attachment to a support surface. As seen in FIG. 27, the flange extends outwardly from the base portion and defines a through-hole for receiving a fastener, such as a nail or screw. The through-hole is sized to receive the body of the fastener with the head of the fastener contacting the upper surface of the flange.

In an additional embodiment (not illustrated), the support units are affixed to the work platform. The support units and work platform may be formed together as a single unit, or may be formed separately and affixed using any suitable method of affixation. Together the support units and work platform have the ability to move (e.g., raise, lower, tilt, spin, etc.) to allow the easier application of surface coatings.

Figure 28A:
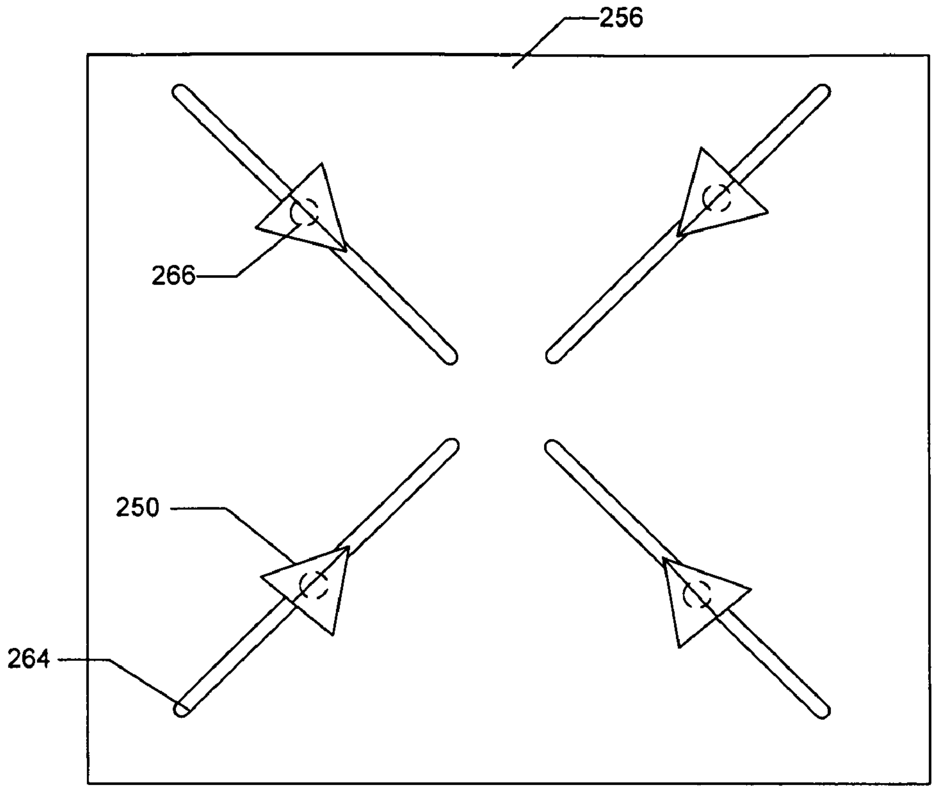
FIG. 28 illustrates support units movably affixed to a work platform, in accordance with one embodiment of the invention.
Figure 28B:
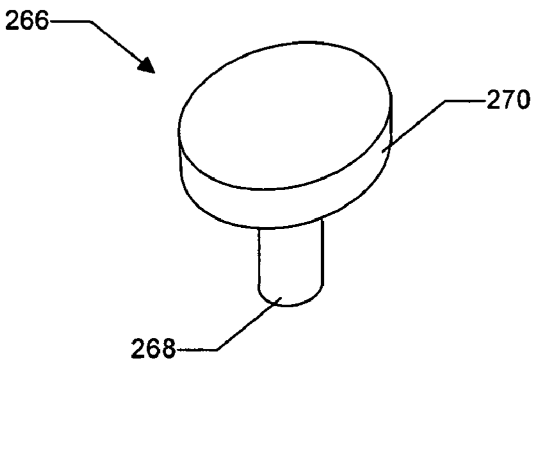

Each of the support units may be movably affixed to the work platform, to enable varied positioning of each support unit relative to the surface of the work platform. Such varied positioning enables the system to support objects of varying sizes and shapes. FIG. 28A illustrates a system in which four support units 250 are movably affixed to a work platform 256. The support units may be movably affixed using any suitable method. In the system of FIG. 28A, each support unit is movably affixed using a connector peg 266 (illustrated in FIG. 28B) interfacing with a channel 264 defined in the work platform. The connector peg comprises a top section 270 sized to be received by hole 253 (in a similar manner as illustrated in FIG. 25*a*), and a bottom section 268 sized to be received by channel 264. A connector peg would be placed into a channel and a support unit would be placed on the connector peg. As the bottom section of the connector peg is configured to slidably move within the channel, the peg and support unit together can be moved to any position along the channel. Once a support unit is in a desired position, a locking device may be activated to hold the support unit in the desired position. As illustrated in FIG. 28A, the channel 264 may be straight, and each channel may be aligned between a corner of the work platform and the center of the work platform. Alternatively, the channel may be curved or S-shaped, or may be any desirable shape.

In an alternative embodiment (not illustrated), positioning of the support units may be accomplished via multiple positioning holes defined in the surface of the work platform. For example, the positioning holes may be arranged in a matrix, evenly spaced across the surface of the work platform. The positioning holes may be sized to receive the bottom section of the connector peg. The support units can be positioned by selecting the appropriate positioning holes and inserting the connector peg (with the support units attached to the top section) in the selected holes.

Figure 29A:
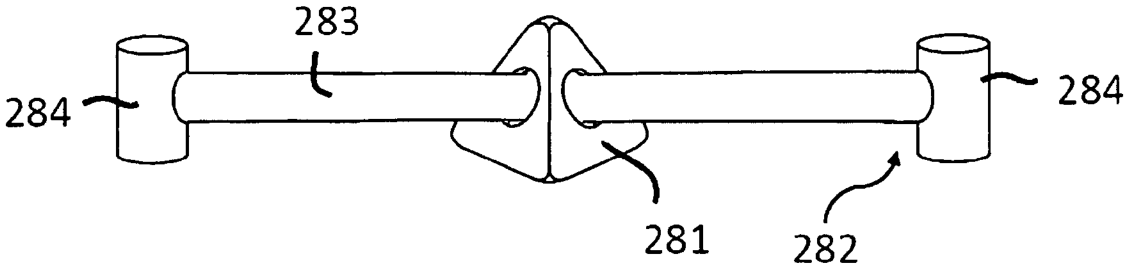
FIG. 29 illustrates a support system comprising of a support unit and individual support members, in accordance with an embodiment of the invention.
Figure 29B:
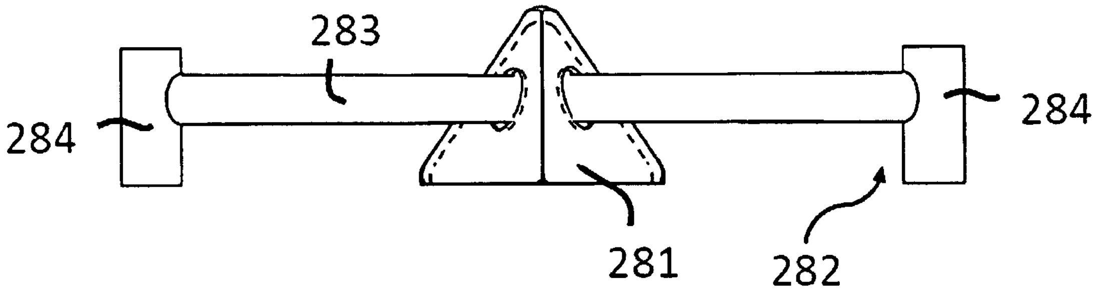
Figure 29C:
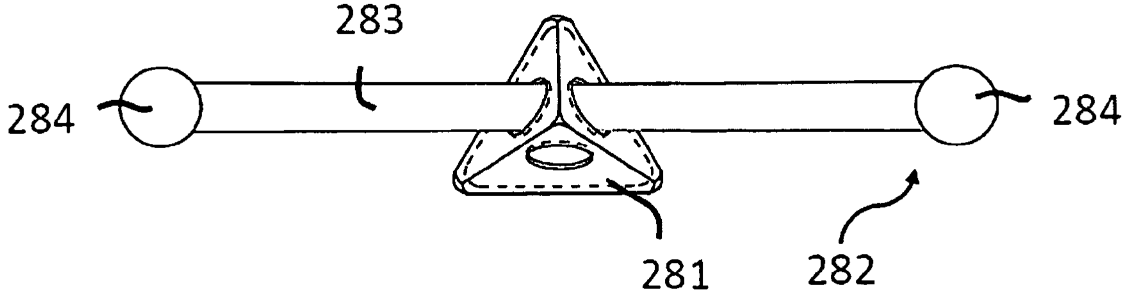
Figures 30A, 30B, 30C, 30D:
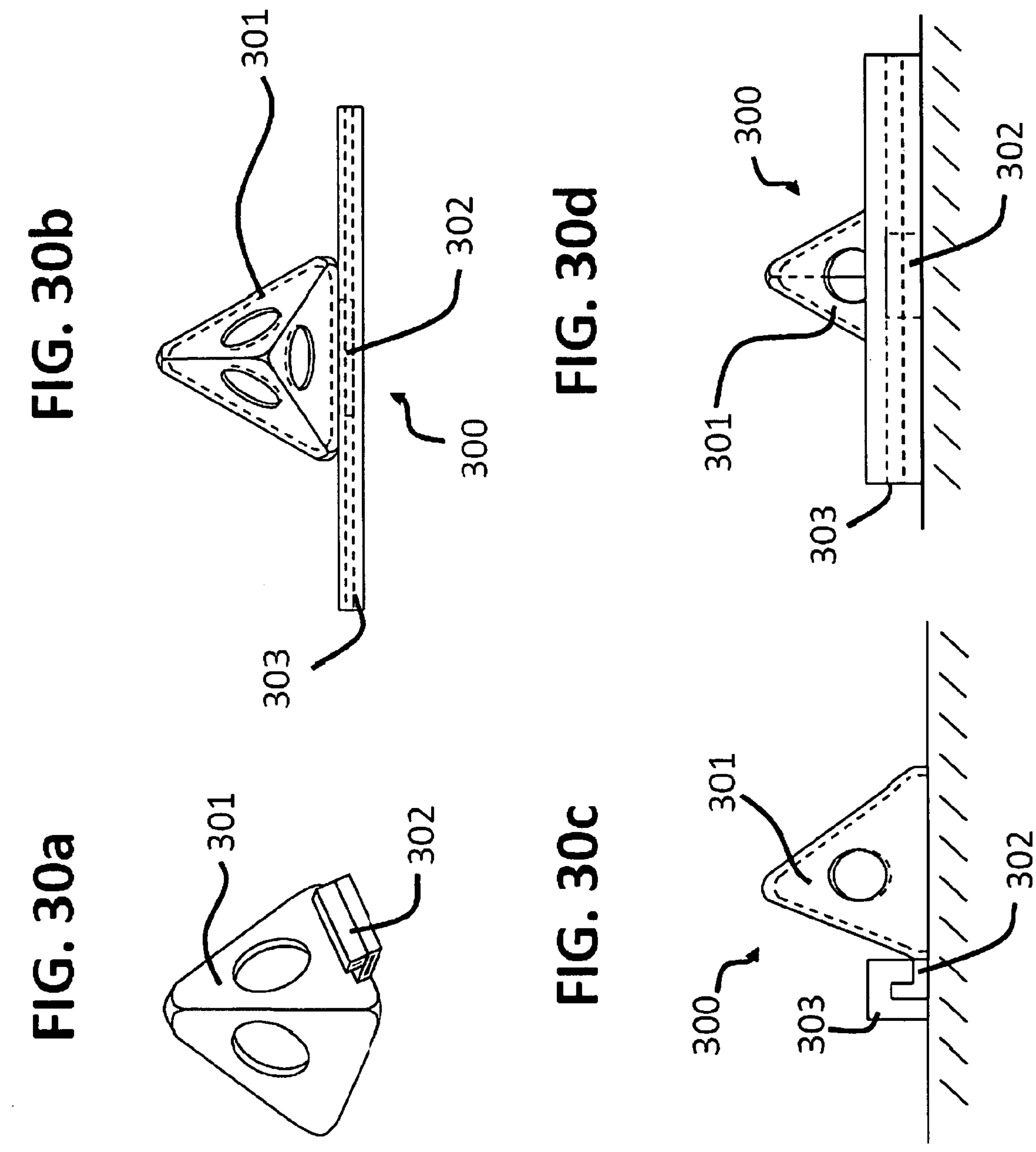
FIG. 30 illustrates a support system comprising of a support unit and a track, in accordance with an embodiment of the invention.

In an alternative embodiment, shown in FIGS. 29*a*, 29*b* and 29*c* (isometric, front and top views, respectively), a support system could comprise one or more support members 282 that allow one or more the support units 281 to be slid along or through the mounting arms 283. The support members could comprise one or more components that affix the support members to the work surface while allowing the support units to slide along the work surface in either a linear or non-linear path. FIG. 29 shows a support member with two primary components. The first component, the mounting arm 283, runs substantially parallel to the work surface and guides the support unit 281 along a predefined path while keeping the support units 281 in contact with work surface (typically in light contact to enable the support units to be moved to different positions as desired). The second component, the mounting hub 284 enables the support member to remain stable and allows the support member to be permanently or temporarily affixed to a work surface.

In another embodiment, shown in FIGS. 30*a*, 30*b*, 30*c* and 30*d* (isometric, top, side and front views, respectively), a support system 300 could comprise a support track 303 mounted directly to the work surface. The support unit 301 could have an interlink feature 302 designed to attach the support units 301 to the support track 303 while allowing one or more support units 301 to slide along the support track on the work surface in a linear or non-linear path.

Figure 31A:
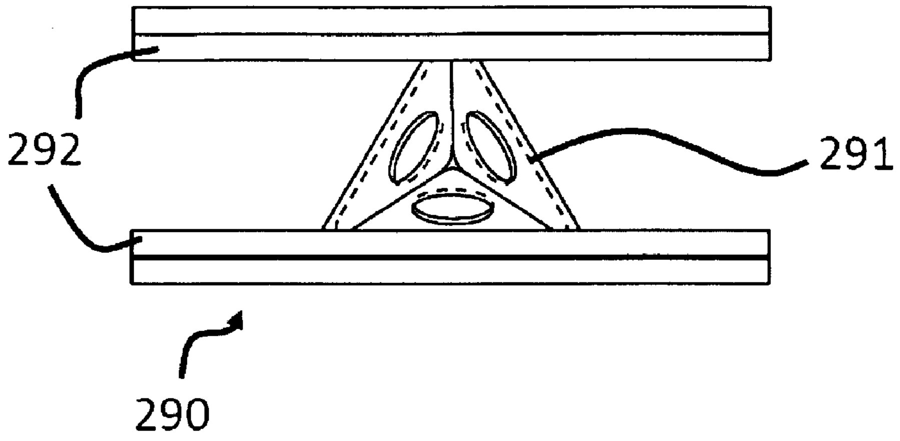
FIG. 31 illustrates a support system comprising of a support unit and more than one track, in accordance with an embodiment of the invention.
Figure 31B:
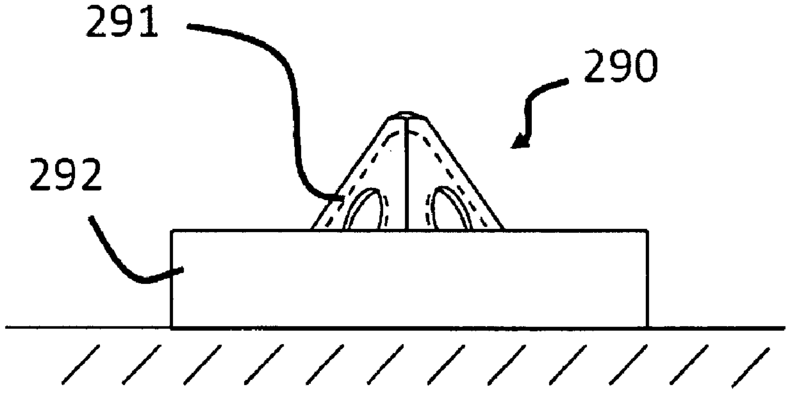
Figure 31C:
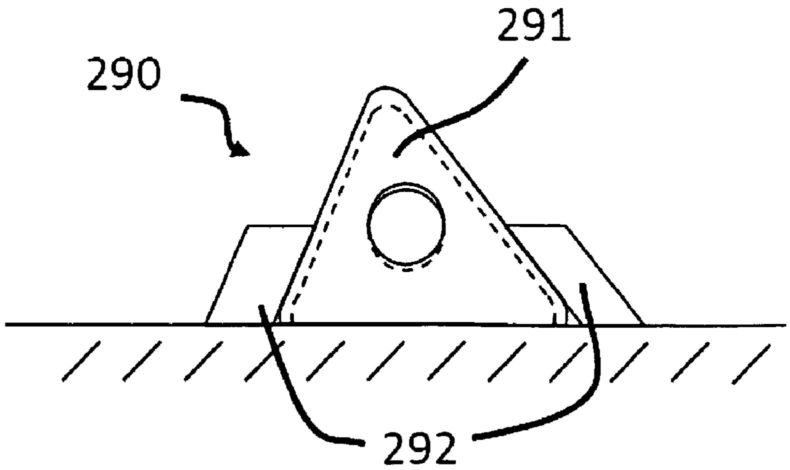

In another embodiment, shown in FIGS. 31*a*, 31*b* and 31*c* (top, front and side views, respectively), a support system 290 could comprise more than one support tracks 292 mounted directly to the work surface. The support tracks would have sloping inner surfaces that mate with the sloping outer surfaces and/or edges of the support unit 291, such that the support unit 291 would nest with the support tracks 292 to allow the support units 291 to slide along the support tracks on work surface in a linear or non-linear path.

Figure 32A:
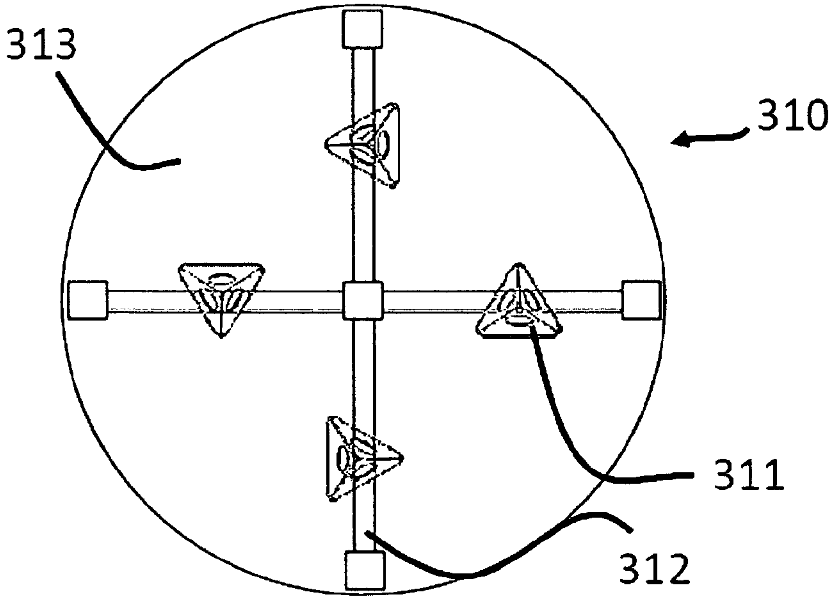
FIG. 32 illustrates a support system comprising support units and support members affixed to a movable work surface.
Figure 32B:
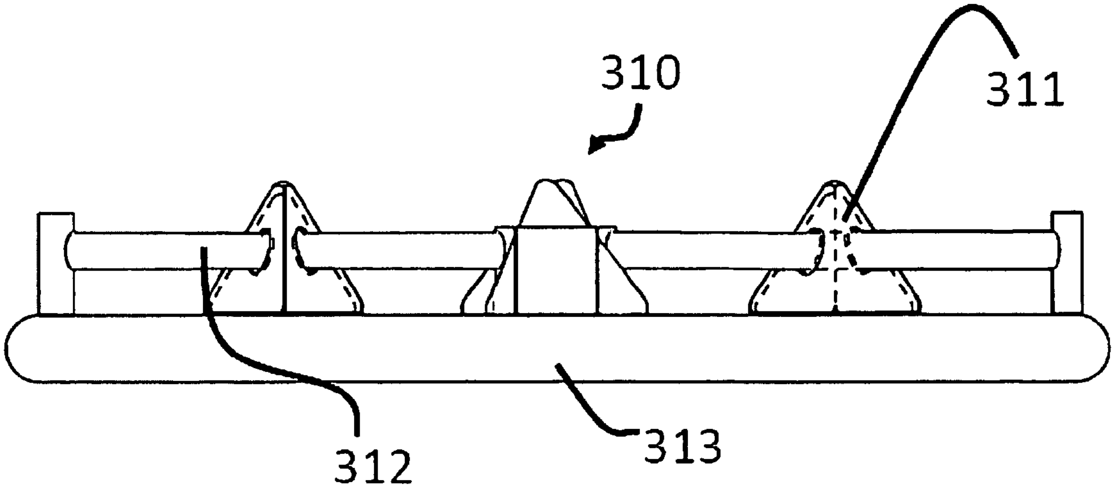

FIGS. 32*a* and 32*b* (top and side views, respectively) illustrate an embodiment of the invention in which a support system 310 comprising support units 311 and support members 312, is affixed to a movable work surface 313. In this embodiment, the work surface 313 is a turntable. Additional work surfaces could be used that allow for linear, non-linear or rotational movement of the support system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for supporting an object during application of surface coating, the system comprising:

a plurality of support units, each support unit comprising a base portion and a contact portion opposite the base portion;

wherein each support unit comprises a polyhedron, the polyhedron comprising a plurality of faces and at least one vertex; wherein the at least one vertex has a curved exterior surface; and a work platform comprising a rotating turntable;

wherein each base portion is adapted to rest stably upon the work platform; wherein each contact portion is configured to contact an underside of the object during application of surface coating, such that the plurality of support units together support the object above the work platform; and wherein at least one of the support units further comprises a recess formed within the support unit to receive a work platform protrusion configured to fit securely within the support unit recess.

2. The system of claim 1, wherein each support unit comprises a cone, such that the base portion comprises a base of the cone and the contact portion comprises a vertex of the cone.

3. The system of claim 1, wherein the base portion comprises one of a face or a plurality of vertices, and wherein the contact portion comprises at least one vertex.

4. The system of claim 1, wherein the polyhedron comprises a tetrahedron, the tetrahedron comprising four triangular faces.

5. The system of claim 1, wherein the polyhedron comprises a tetrahedron, the tetrahedron comprising three triangular faces defining a hollow cavity, an edge of each of the three faces together defining an opening to the hollow cavity.

6. The system of claim 1, further comprising:

a plurality of spacer arms, each spacer arm connected to two support units and adapted to maintain a position of one support unit relative to one other support unit.

7. The system of claim 1, further comprising:

a spacer frame connected to each of the support units and adapted to maintain a position of each support unit relative to each other support unit.

8. The system of claim 7, wherein the spacer frame is affixed to the rotating turntable.

9. The system of claim 1, wherein each of the support units further comprises a cavity formed within the support unit, the cavity shaped to receive a portion of any other support unit such that one support unit can nest within another support unit.

10. The system of claim 1, wherein each of the support units further comprises at least one flange extending outwardly from the base portion, the flange defining the recess for receiving the work platform protrusion.

11. The system of claim 1, wherein each of the support units is affixed to the work platform.

12. The system of claim 11, wherein each of the support units is movably affixed to the work platform.

13. The system of claim 1, wherein the support units and work platform are configured to raise, lower, tilt, or spin.

14. The system of claim 1, wherein each contact portion has a curved exterior surface.

15. The system of claim 1, wherein each contact portion has a tapered exterior surface.

16. The system of claim 1, wherein each contact portion has a pointed exterior surface.

17. The system of claim 1, wherein the work platform comprises a recess formed within to receive a portion of the support unit.

18. The system of claim 1, wherein each support unit further comprises three triangular faces defining a hollow cavity, an edge of each of the three triangular faces together defining an opening to the hollow cavity.

19. The system of claim 18, wherein the contact portion of each support unit comprises a vertex formed by a junction of the three triangular faces.

20. The system of claim 19, wherein the vertex has a curved exterior surface.

21. A system for supporting an object during application of surface coating, the system comprising:

a plurality of support units, each support unit comprising a base portion and a contact portion opposite the base portion;

wherein each support unit comprises a polyhedron, the polyhedron comprising a plurality of faces and at least one vertex; wherein the at least one vertex has a curved exterior surface;

a work platform comprising a rotating turntable;

a spacer frame affixed to the rotating turntable and connected to each of the support units and adapted to maintain a position of each support unit relative to each other support unit; and wherein each base portion is configured to rest stably upon the work platform; and wherein each contact portion is configured to contact an underside of the object during application of surface coating, such that the plurality of support units together support the object above the work platform.

22. The system of claim 21, wherein each support unit comprises a cone, such that the base portion comprises a base of the cone and the contact portion comprises a vertex of the cone.

23. The system of claim 21, wherein the base portion comprises one of a face or a plurality of vertices, and wherein the contact portion comprises at least one vertex.

24. The system of claim 21, wherein the polyhedron comprises a tetrahedron, the tetrahedron comprising four triangular faces.

25. The system of claim 21, wherein the polyhedron comprises a tetrahedron, the tetrahedron comprising three triangular faces defining a hollow cavity, an edge of each of the three faces together defining an opening to the hollow cavity.

26. The system of claim 21, wherein each of the support units further comprises a cavity formed within the support unit, the cavity shaped to receive a portion of any other support unit such that one support unit can nest within another support unit.

27. The system of claim 21, wherein each of the support units further comprises at least one flange extending outwardly from the base portion, the flange defining a through-hole for receiving a fastener capable of securing the support unit to the work platform.

28. The system of claim 21, wherein each of the support units is affixed to the work platform.

29. The system of claim 28, wherein each of the support units is movably affixed to the work platform.

30. The system of claim 21, wherein the support units and work platform are configured to raise, lower, tilt, or spin.

31. The system of claim 21, wherein each contact portion has a curved exterior surface.

32. The system of claim 21, wherein each contact portion has a tapered exterior surface.

33. The system of claim 21, wherein each contact portion has a pointed exterior surface.

34. The system of claim 21, wherein at least one of the support units further comprises a recess formed within the support unit to receive a work platform protrusion adapted to fit securely within the support unit recess.

35. The system of claim 21, wherein the work platform comprises a recess formed within to receive a portion of the support unit.

36. The system of claim 21, wherein each support unit further comprises three triangular faces defining a hollow cavity, an edge of each of the three triangular faces together defining an opening to the hollow cavity.

37. The system of claim 36, wherein the contact portion of each support unit comprises a vertex formed by a junction of the three triangular faces.

38. The system of claim 37, wherein the vertex has a curved exterior surface.

* * * * *